US010413853B2

(12) United States Patent
Kawamoto et al.

(10) Patent No.: US 10,413,853 B2
(45) Date of Patent: Sep. 17, 2019

(54) GAS-LIQUID SEPARATOR

(71) Applicant: KABUSHIKI KAISHA YOKOTA SEISAKUSHO, Hiroshima-shi, Hiroshima (JP)

(72) Inventors: Isao Kawamoto, Hiroshima (JP); Shinji Kumanaka, Hiroshima (JP); Kenji Takahashi, Hiroshima (JP)

(73) Assignee: KABUSHIKI KAISHA YOKOTA SEISAKUSHO, Hiroshima-shi (JP)

( * ) Notice: Subject to any disclaimer, the term of this patent is extended or adjusted under 35 U.S.C. 154(b) by 192 days.

(21) Appl. No.: 15/529,225

(22) PCT Filed: Nov. 30, 2015

(86) PCT No.: PCT/JP2015/083657
§ 371 (c)(1),
(2) Date: May 24, 2017

(87) PCT Pub. No.: WO2016/088725
PCT Pub. Date: Jun. 9, 2016

(65) Prior Publication Data
US 2017/0326488 A1 Nov. 16, 2017

(30) Foreign Application Priority Data

Dec. 2, 2014 (JP) .................................. 2014-244505

(51) Int. Cl.
*B01D 45/14* (2006.01)
*B01D 19/00* (2006.01)
(Continued)

(52) U.S. Cl.
CPC ............ *B01D 45/14* (2013.01); *A47L 7/0014* (2013.01); *B01D 19/00* (2013.01);
(Continued)

(58) Field of Classification Search
CPC ................ B01D 19/00; B01D 19/0042; B01D 19/0052; B01D 45/12; B01D 45/14
(Continued)

(56) References Cited

U.S. PATENT DOCUMENTS 4,410,337 A 10/1983 Gullichsen et al.
4,585,465 A 4/1986 Suzuki et al.
(Continued)

FOREIGN PATENT DOCUMENTS

JP 57-007208 A 1/1982
JP 61-036444 B2 8/1986
(Continued)

OTHER PUBLICATIONS

PCT/JP2015/083657: International Search Report dated Mar. 1, 2016.
(Continued)

*Primary Examiner* — Robert A Hopkins
(74) *Attorney, Agent, or Firm* — Kratz, Quintos & Hanson, LLP

(57) ABSTRACT

The present invention provides a gas-liquid separator with enhanced performance and easy operation, capable of performing gas-liquid separation such as advanced defoaming or degassing, and with a structure that facilitates easy CIP cleaning and disassembly cleaning, allowing it to meet sanitary specifications.

This gas-liquid separator for gas-liquid separation performed by centrifugal force of an impeller mounted on a shaft which is supported by a bearing part and rotates in a casing comprises: the axial end of the impeller farther from the bearing part being positioned with clearance from the inner wall of the casing so as to slide on the inner wall of the casing; an exhaust outlet of the casing disposed in a position opposite the sliding impeller part; a vacuum device con-
(Continued)

nected to the exhaust outlet; a discharge impeller part providing discharge force to the passing fluid formed around the axial end of the impeller; a discharge outlet of the casing disposed in a position opposite the discharge impeller part; and a suction inlet of the casing disposed in a position closer to the bearing part than the discharge outlet.

20 Claims, 26 Drawing Sheets

(51) Int. Cl.
*F04B 53/06* (2006.01)
*A47L 7/00* (2006.01)
*A47L 9/16* (2006.01)

(52) U.S. Cl.
CPC ..... *B01D 19/0042* (2013.01); *B01D 19/0052* (2013.01); *B01D 19/0057* (2013.01); *F04B 53/06* (2013.01); *A47L 9/1675* (2013.01)

(58) Field of Classification Search
USPC ............ 55/424; 95/241, 247, 248, 260, 261; 96/196, 204, 217
See application file for complete search history.

(56) References Cited

U.S. PATENT DOCUMENTS

| | | | |
|---|---|---|---|
| 5,711,789 A | * | 1/1998 | Elonen ............... B01D 19/0052 95/261 |
| 6,629,821 B1 | | 10/2003 | Yokota et al. |
| 2006/0064954 A1 | | 3/2006 | Yokota et al. |

FOREIGN PATENT DOCUMENTS

| | | |
|---|---|---|
| JP | 2003-001010 A | 1/2003 |
| JP | 2005-110527 A | 4/2005 |
| JP | 2008-142592 A | 6/2008 |
| WO | 2001002732 A1 | 1/2001 |
| WO | 2004058380 A1 | 7/2004 |
| WO | 2005032280 A1 | 4/2005 |

OTHER PUBLICATIONS

PCT/JP2015/083657: International Preliminary Report on Patentability dated Jun. 6, 2017.

* cited by examiner

PRIOR ART

PRIOR ART

PRIOR ART

GAS-LIQUID SEPARATOR

TECHNICAL FIELD

The present invention relates to a gas-liquid separator that performs advanced gas-liquid separation such as defoaming or degassing, and is easy to clean and disassemble, and is suitable for sanitary specifications.

BACKGROUND ART

Generally recognized systems referred to as gas-liquid separators for defoaming and degassing include container type devices that are filled with liquid and then heated or decompressed, systems that employ a gas permeation membrane which only the gas can pass, and systems employing centrifugation.

Of the above systems, the heating and decompressing types are mainly for batch processing, and are unsuitable for continuous processing, and they have the further disadvantage of larger space requirements. In the permeation membrane type system, clogging of the membrane occurs easily as a result of particles or solids in the liquid, and this entails increased replacement costs.

In contrast, the centrifugation system is suitable for continuous processing, having the advantage of not being impaired by particles and solids. However, the following problems still remain unsolved.

Firstly, there remains the problem of insufficient gas-liquid separation performance when the system is applied to advanced defoaming or degassing operations.

In the centrifugation system, since the separation is performed using only the mass difference between the gas and liquid, if a powerful vacuum device is installed then the centrifugal separation performance may be overwhelmed by the suction power of the vacuum device, which may cause liquid penetration into the vacuum device. Therefore, with the centrifugation system, it is no easy task to achieve powerful removal of the gas only. For advanced defoaming and degassing performance, a powerful vacuum device is required. However this also means that the pumped liquid may become mixed with the gas and be drawn easily into the vacuum device. This can become a constraint when applying the system to advanced defoaming or degassing operations, causing insufficient gas-liquid separation performance.

Secondly, in applications for treatment of food materials and ultra-pure liquids, there is the problem of insufficient cleanability, both for CIP (Cleaning In Place: internal cleaning without disassembly) cleaning and disassembly cleaning.

Normally, the apparatus used for the above purposes requires, as "sanitary specifications", not only a flat and smooth liquid contact surface, but also a structure in which easy CIP cleaning, disassembly cleaning, and reassembly can be performed. However, the structure of the centrifugation system is complicated due to its rotating parts, which means disassembly is difficult. CIP cleaning of liquid contact parts without leaving any shadows is also difficult due to the complicated passages.

International Publication WO2001/02732 (Patent Document 1) is an invention which focuses on solving the first of the aforementioned problems, that is, the gas-liquid separation performance. (This invention will be hereinafter called "Original Invention 1".)

As exemplified in FIG. 24, the structure of the apparatus according to Original Invention 1 includes a gas-liquid separator installed in the passage of a liquid-feed main pump 31, and a gas-liquid separating impeller 33 which rotates by means of a motor 34 and is installed in the gas-liquid separator container 32 that is provided with an inlet 32a and an outlet 32b. A cavity holder 35 is also installed, and holds the tail bottom of a tornado-shaped cavity s caused by the rotation, preventing it from extending and being suctioned by the main pump 31. Clearance t between the cavity holder 35 and the inner wall of the container 32 is narrowed to a passage area which passes only the pumped liquid, which is pressed against the inner wall of the container 32 by the centrifugal force produced by rotation of the gas-liquid separating impeller 33. An exhaust pipe 36 opens near the center of the tornado-shaped cavity s to draw out the cavity gas by means of a vacuum device 37 via the exhaust pipe 36 and an exhaust passage r.

Also, a protection means 38 is installed in the exhaust passage r. This device only allows the gas to pass to the vacuum device 37, preventing the pumped liquid from passing in case the pumped liquid is mixed into the exhaust gas. In addition, a gas return passage u and a boosting means 39 are also employed for the special purpose of remixing the exhausted gas into the pumped liquid after the liquid is sent by the main pump 31, returning the pumped liquid to its original condition.

In Original Invention 1, gas bubbles in the pumped liquid are forcibly separated by the centrifugal force produced by the rotation of the gas-liquid separating impeller 33, and the cavity holder 35 prevents the tail bottom of the tornado-shaped cavity s from extending and passing through to the downstream side. Furthermore, since the rotating liquid that is pushed against the inner wall of the container 32 takes priority for the flow through clearance t, there is little possibility of gas bubbles passing through clearance t. Therefore, gas can be collected effectively and drawn out by the vacuum device 37. This largely resolves the aforementioned first problem, that is the gas-liquid separation performance.

In Original Invention 1, however, the aforementioned second problem, that is the insufficient cleanability of the system, has not been resolved in any way. There is, instead, the occurrence of new shadows or bottlenecks which create cleaning problems such as on the back side of the cavity holder 35 or in the exhaust pipe 36 installation part. This is due to the presence of cavity holder 35 and clearance t which are employed to improve the gas-liquid separation performance. The system cannot be used with various kinds of liquids because there is the possibility of clogging due to the bottleneck in the case of liquids such as food materials that contain particles or lumps. Further problems also occur. For example, because the cavity is simply drawn into the exhaust pipe 36 opening, if the formed cavity becomes unstable, then the entry of pumped liquid into the exhaust passage cannot be prevented. This makes it necessary to depend on a separately installed protection means 38 to remove the intruding liquid.

International Publication WO2004/058380 (Patent Document 2) is an invention proposed to simultaneously solve the first of the aforementioned problems, that is, the gas-liquid separation performance, and also the second problem, that is, the insufficient cleanability. (This invention will be hereinafter called "Original Invention 2".)

As exemplified in FIG. 25 and FIG. 26, the structure of the apparatus according to Original Invention 2 includes a casing which can be separated into 1a and 1b and forms one cylindrical chamber when connected, and an impeller 2 rotated by a motor. The impeller 2 is provided with a separation impeller part 2s which performs gas-liquid separation in all areas around the rotating peripheral area, and a discharge impeller part 2d which is formed by expanding the diameter near the one axial end 2r so as to provide discharge pressure to the pumping liquid. Also, a discharge outlet b is formed in the casing 1a at a position opposite the discharge impeller part 2d.

At the same time, the other axial end 2f of the impeller 2 is formed to slide along the inner wall of the casing 1a while maintaining the smallest possible predetermined clearance. Also, an exhaust outlet e is formed near the center of the casing 1a opposite the sliding impeller part for discharging the cavity gas generated from the gas-liquid separation, and the exhaust outlet e is connected to the vacuum device. A suction inlet a is formed in the casing 1a at a position between the discharge outlet b and the exhaust outlet e.

Also, a cleaning fluid inlet c for cleaning inside of the apparatus is provided at a position near a shaft sealing part 4 of a rotating shaft 3.

When this apparatus is operated, the pumped liquid flows in from the suction inlet a after being throttled by a throttle means 7. Gas bubbles in the pumped liquid are forced into centrifugal separation by the rotation of the separation impeller part 2s, and the liquid flows toward the discharge outlet b while forming a thin layer on the inner peripheral wall of the casing 1a. At the same time, the gas gathers near the center of the impeller 2 to form a cavity. The cavity gas is drawn out by the vacuum device from the exhaust outlet e located near the center of rotation.

Even if the pumped liquid is mixed into the gas flowing toward the exhaust outlet e, because the mass of the liquid is larger than that of the gas, the liquid is shaken off by the centrifugal force of the separation impeller part 2s. In addition, because the sliding clearance between the axial end 2f and the casing 1a is small, the liquid cannot penetrate from this area either. Therefore, the pumped liquid does not flow into the vacuum device during operation, the vacuum device is safe, and enhanced gas-liquid separation can be performed using the powerful vacuum device.

When performing CIP cleaning of this apparatus, liquid contact parts can be cleaned without leaving any shadows by pouring cleaning fluid into the apparatus from the suction inlet a or the cleaning fluid inlet c, and discharging it from the discharge outlet b, the exhaust outlet e or the drain d while the apparatus is in operation. Also, when performing disassembly cleaning of this apparatus, cleaning of liquid contact parts and reassembly is easy because the casing can be easily separated into parts 1a and 1b. The impeller 2 is exposed completely after the separation, and can be easily pulled out from the rotating shaft 3.

Thus, the apparatus according to Original Invention 2 enables gas-liquid separation functions such as advanced defoaming or degassing operations. It also has sufficient cleanability, and allows both CIP cleaning and disassembly cleaning in order to meet sanitary specifications. Therefore it is extremely practical and useful, however the following problems still remain unsolved in some applications, particularly when increasing its size.

Firstly, it is vulnerable to an eccentric load to the rotating shaft 3 in the radial direction caused when the flow of the pumped liquid flowing in from the suction inlet a becomes uneven. In particular when the liquid is highly viscous or contains lumps, this eccentric load may further increase and result in axial runout, posing a problem for a smooth operation of this apparatus.

In Original Invention 2, the impeller 2 is configured so that the discharge impeller part 2d near the one axial end 2r faces the discharge outlet b, the other axial end 2f faces the exhaust outlet e, and the suction inlet a is located between these two axial ends. With this structure, after the pumped liquid fed from the suction inlet a is separated into a liquid portion and a gas portion by the centrifugal force of the impeller 2, the separated liquid portion and gas portion flow in opposite directions. In other words, it is structured so that the part which performs the liquid discharge function and the part which performs the gas exhaust function on the impeller 2 are arranged in series with the space for the suction inlet a interposed between them. This means that it requires a sufficient space in the axial direction and therefore the overhang of the rotating shaft 3 has to be long. As a result, it is vulnerable to an eccentric load to the rotating shaft 3 in the radial direction caused by an uneven flow of the pumped liquid flowing in from the suction inlet a. Consequently if the apparatus is to be enlarged, it is necessary to enlarge or strengthen the parts around the rotating shaft 3 and the bearing part 5. This poses a restriction to enlargement of the apparatus.

Secondly, it still requires improvement in terms of workability in disassembly or assembly operations.

In Original Invention 2, the structure of the apparatus is made simple to facilitate easy disassembly cleaning and reassembly. The casings 1a and 1b can be easily separated, and the impeller 2 can be easily pulled out from the rotating shaft 3. However, if the apparatus is enlarged, there are problems in the disassembly cleaning and reassembly operations. Attachment and detachment of the longish, bulky and heavy casing 1a under the large overhang condition is not easy, and attachment and detachment of piping at the suction inlet a or the discharge outlet b of the casing 1a is also troublesome. This also poses a restriction to enlargement of the apparatus.

DOCUMENTS OF PRIOR ART

Patent Documents

Patent Document 1: International Publication WO 2001/02732
Patent Document 2: International Publication WO 2004/058380

SUMMARY OF THE INVENTION

Problems to be Solved by the Invention

An object of the present invention, in respect to the above-mentioned circumstances, is to provide a gas-liquid separator with enhanced performance and easy operation, having a gas-liquid separation mechanism with a simple structure and stable and dependable operation, allowing the use of a powerful vacuum device. This enables gas-liquid separation functions such as advanced defoaming or degassing operations, facilitates easy CIP cleaning and disassembly cleaning to meet sanitary specifications, and makes possible its use with various kinds of liquids. Particularly, it aims to provide a gas-liquid separator with excellent durability and workability which is durable against an eccentric load to the rotating shaft caused by an uneven flow of the pumped liquid on the suction side. It can easily be enlarged in size, and enables attachment and detachment of the components for disassembly cleaning or inspection with minimal labor.

Means for Solving the Problems

To attain the above object, the gas-liquid separator according to the present invention for gas-liquid separation performed by centrifugal force of an impeller mounted on a shaft which is supported by a bearing part and rotates in a casing comprises: the axial end of the impeller farther from the bearing part being positioned with clearance from the inner wall of the casing so as to slide on the inner wall of the casing; an exhaust outlet of the casing disposed in a position opposite the sliding impeller part; a vacuum device connected to the exhaust outlet; a discharge impeller part providing discharge force to the passing fluid formed around the axial end of the impeller; a discharge outlet of the casing disposed in a position opposite the discharge impeller part; and a suction inlet of the casing disposed in a position closer to the bearing part than the discharge outlet.

In the present invention, the opening of the suction inlet to the inside of the casing may be disposed in a position inwardly apart from the inner peripheral wall of the casing by a predetermined distance.

The impeller may be provided with at least one baffle member which prevents the direct penetration of liquid near the rotating shaft into the exhaust outlet.

The opening of the exhaust outlet to the inside of the casing may be disposed in a position inwardly apart from the inner wall of the casing by a predetermined distance.

The impeller may be provided with at least one cylindrical member coaxially attached to the impeller.

A cleaning fluid inlet may be provided on the casing.

At least one of a throttle means, a heating means, an accumulation means, a cavitation generating means, and/or an automatic control means for flow rate, pressure or temperature may be inserted in the passage of the passing fluid.

A protection means which allows gas passage but prevents liquid passage may be inserted in the exhaust passage from the exhaust outlet to the vacuum device.

At least a portion of the discharged fluid from the discharge outlet may be returned to the suction inlet.

Effect of the Invention

Because of this configuration, the apparatus according to the present invention performs advanced gas-liquid separation using a powerful vacuum device. It is free from troubles caused by pumped liquid penetration into the vacuum device, and is durable against an eccentric load to the rotating shaft caused by an uneven flow of the pumped liquid on the suction side. It can also be easily enlarged in size. Also, liquid contact parts can be cleaned without leaving any shadows during CIP cleaning, and easy disassembly cleaning and reassembly are also possible. Attachment and detachment of components for disassembly cleaning or inspection can be done with minimal labor. The system can be used with various kinds of liquids such as food materials and chemicals, and supports various specifications.

DESCRIPTION OF THE PREFERRED EMBODIMENTS

Figure 1:
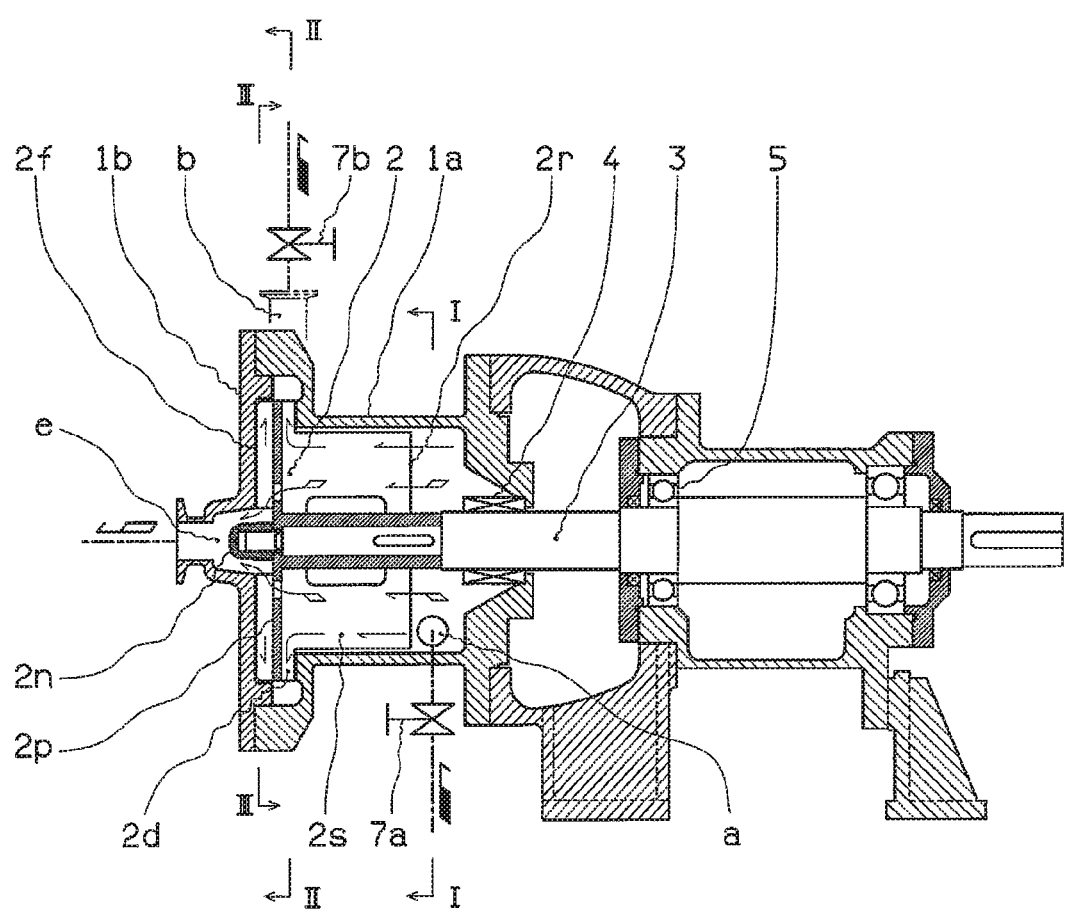
FIG. 1 is a vertical sectional view (partially a side view) of the first embodiment of the present invention.

Each embodiment of the present invention will be explained in detail using the same reference numerals that are common to each figure.

Embodiment 1

Figure 2:
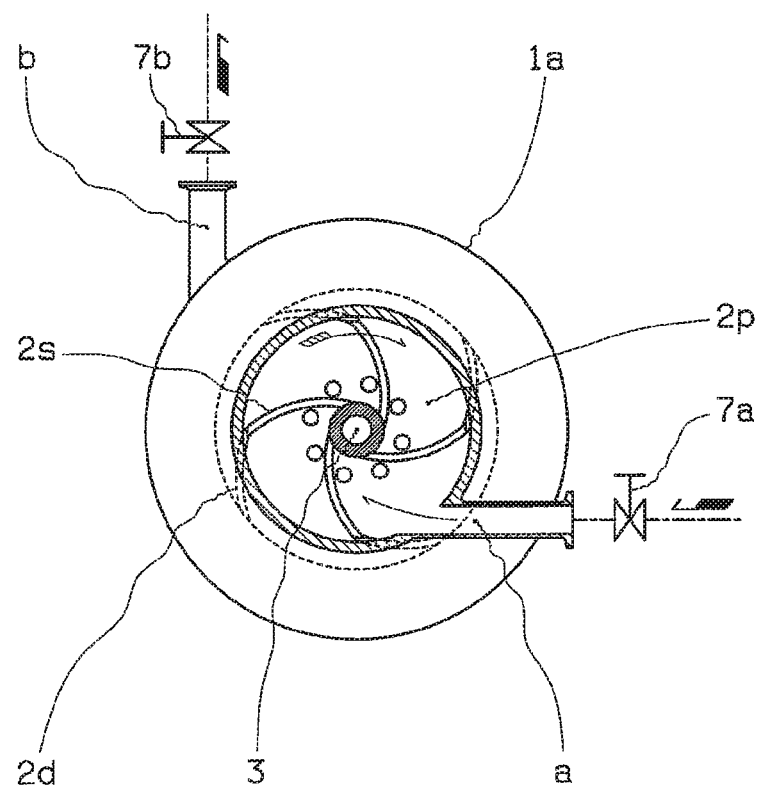
FIG. 2 is a sectional view along the line I-I in FIG. 1.
Figure 3:
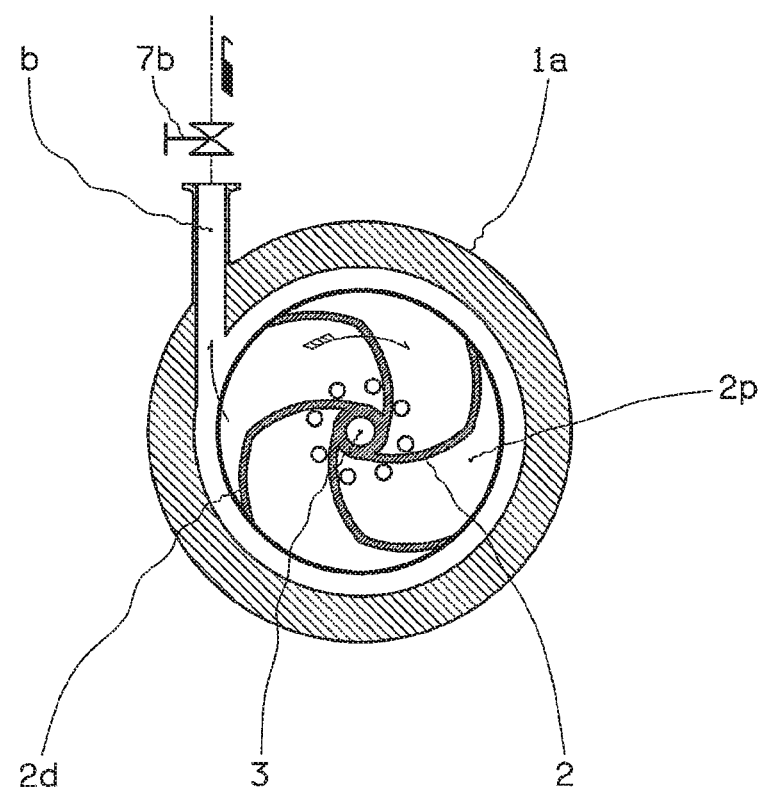
FIG. 3 is a sectional view along the line II-II in FIG. 1.
Figure 4:
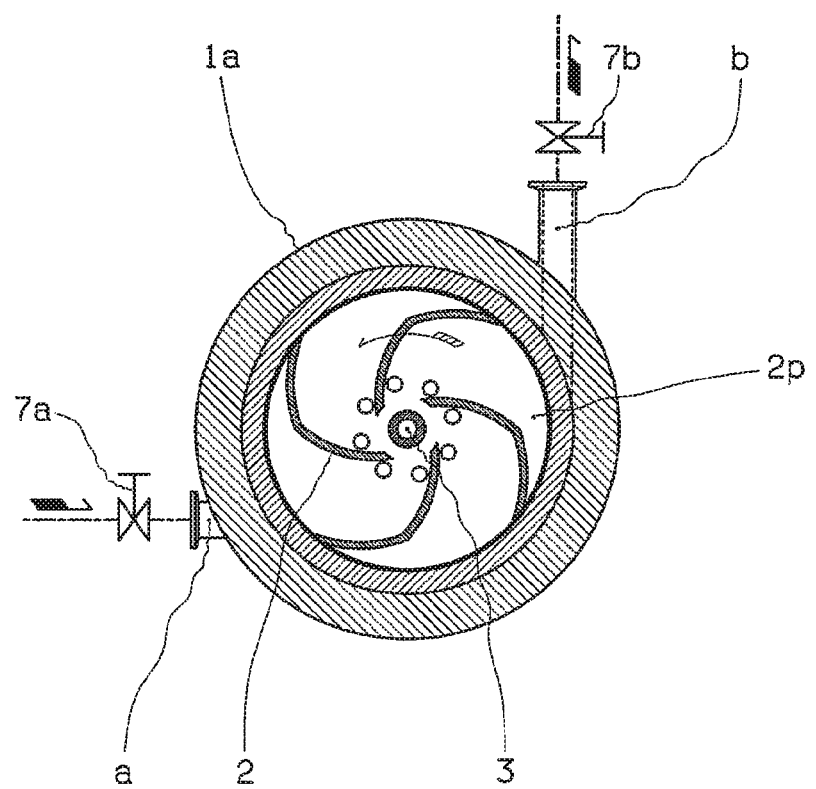
FIG. 4 is a sectional view along the line III-III in FIG. 1.

FIG. 1 shows the first embodiment of the present invention, FIG. 2 shows section I-I in FIG. 1, FIG. 3 shows section II-II in FIG. 1, and FIG. 4 shows section III-III in FIG. 1.

A casing can be separated into 1*a* and 1*b* and forms one cylindrical chamber when connected, and an impeller 2 with a suitable number of vanes is disposed in the casing 1*a* and 1*b*. The impeller 2, with an outer diameter that allows for a small clearance with respect to the inner peripheral wall of the casing 1*a*, is mounted to one end of a rotating shaft 3. Although it may be mounted by screwing, it is here mounted with an impeller nut 2*n* as illustrated in this embodiment. The rotating shaft 3 is supported by a shaft bearing part 5, and penetrates the casing 1*a* with tight sealing at a shaft sealing part 4. A motor, not shown in the figure, drives the rotation.

The impeller 2 is provided with a separation impeller part 2*s* which performs gas-liquid separation in all areas around the rotating peripheral area, and opposite axial ends 2*f* and 2*r* on either side of this separation impeller part 2*s*. The one axial end 2*f* (the left end in FIG. 1) which is at a position farther from the shaft bearing part 5 is formed to slide along the inner wall of the casing 1*b* while maintaining the smallest possible predetermined clearance. Also, an exhaust outlet e is formed near the center of the casing 1*b* opposite the sliding axial end 2*f* for discharging the cavity gas generated from the gas-liquid separation. The exhaust outlet e is connected to a vacuum device, not shown in the figure.

The outer diameter of the part near the axial end 2f is expanded to form a discharge impeller part 2d so as to provide discharge power (discharge pressure) to the pumping liquid. Also, a discharge outlet b is formed in the casing 1a at a position opposite the discharge impeller part 2d.

A suction inlet a is formed in the casing 1a at a position closer to the shaft bearing part 5 than the discharge outlet b.

For the suction inlet a, the inflow angle may be suitably selected. The figure shows an example of the suction inlet a formed to create a flow path that is drawn in from the inner peripheral wall of the casing 1a toward the center along the rotation direction of the impeller 2 so as to promote a smooth inflow.

The exhaust outlet e does not need to be on the center line of the rotating shaft 3 and it may deviate from the rotating shaft center. However an appropriate position not too far from the center should be selected because liquid pushed against the inner peripheral wall of the casing 1a is likely to penetrate the exhaust outlet e if the exhaust outlet e is too far from the rotating shaft center.

In this embodiment, a baffle member 2p (a plate member in this embodiment), which prevents liquid near the rotating shaft 3 from directly penetrating into the exhaust outlet e, is provided on the impeller 2 at a position near the exhaust outlet e so that only gas can pass easily through a suitable number of holes or slits provided near the rotating shaft center.

This baffle member 2p also functions as a shroud to increase strength around the discharge impeller part 2d and to facilitate obtaining sufficient discharge pressure.

A throttle means 7a, which decompresses the pumped liquid, is inserted in the passage of the suction inlet a. It is known that gas dissolved in liquid can be separated to form bubbles when decompressed by flow restriction. In this embodiment, gas bubbles separated from the pumped liquid by decompression using the throttle means 7a are forced into centrifugal separation for improved gas-liquid separation performance. A throttle means 7b is inserted in the passage after the discharge outlet b, and by operating together with the throttle means 7a, it is possible to control the flow rate and pressure of the passing liquid.

The vacuum device may be a fluid ring type vacuum pump, other type of a vacuum pump, or a negative-pressure generating apparatus.

When this apparatus is installed to a pipeline and operated, the pumped liquid is fed from the suction inlet a to the discharge outlet b by the pump action of the discharge impeller part 2d. Gas bubbles in the pumped liquid are forced into centrifugal separation by the rotation of the separation impeller part 2s, and the liquid flows toward the discharge outlet b while forming a thin layer on the inner peripheral wall of the casing 1a. At the same time, the gas gathers near the center of the impeller 2 to form a cavity. The cavity gas is drawn out by the vacuum device from the exhaust outlet e near the center of rotation.

This process of gas-liquid separation is based on the powerful centrifugal force generated by the separation impeller part 2s, formed over a wide area of the rotating periphery of the impeller 2, which forces the pumped liquid to rotate. This produces a good cavity with significantly less intrusion of liquid compared with a simple cyclonic type system, and provides powerful gas-liquid separation.

By setting the impeller diameter and rotation speed so that the centrifugal force of the impeller part near the axial end 2f is stronger than the suction force of the vacuum device, the intruding liquid cannot approach the exhaust outlet e even if the pumped liquid is mixed into the gas flowing toward the exhaust outlet e. This is because the mass of the liquid is larger than that of the gas, and the liquid is shaken off by the centrifugal force around the axial end 2f, and also because there is no pressure pressing this liquid portion back to the center. In addition, because the sliding clearance with the casing 1b on the axial end 2f is small, the liquid cannot penetrate from this area either. Therefore, the pumped liquid does not flow into the vacuum device during operation, the vacuum device is safe, and enhanced gas-liquid separation can be performed using the powerful vacuum device. Due to the above structure, this apparatus can also be used as a pump providing high self-priming performance.

Also, in this embodiment, even if the pumped liquid is mixed into the cavity gas near the center of rotation, the liquid portion is blocked and shaken off by the baffle member 2p and is prevented from directly penetrating into the exhaust outlet e. Therefore, the vacuum device is even safer and it can powerfully suction and discharge only the gas passing through the holes or slits provided near the center of the rotating shaft 3.

In the apparatus of the present invention, the impeller 2 is configured so that one axial end 2f faces the exhaust outlet e, and the discharge impeller part 2d around the same axial end 2f faces the discharge outlet b, while the suction inlet a is located at a position near the axial end 2r which is opposite to the axial end 2f. With this structure, after the pumped liquid fed from the suction inlet a is separated into a liquid portion and a gas portion by the centrifugal force of the impeller 2, the separated liquid portion and gas portion are both discharged in the area near the axial end 2f. In other words, it is structured so that the part which performs the liquid discharge function and the part which performs the gas exhaust function on the impeller 2 are both located near the one axial end 2f, adjacent to each other and integrated in a compact form. This means that it requires only a small space in the axial direction and therefore the overhang of the rotating shaft 3 is small. As a result, it is durable against an eccentric load to the rotating shaft 3 in the radial direction, and is very stable.

An eccentric load in the radial direction is often caused by an uneven or unstable flow of the pumped liquid flowing in from the suction inlet a. In particular when the liquid is highly viscous or contains lumps, it is possible that this eccentric load will further increase. However, in the apparatus of the present invention, the structure is not easily affected by an eccentric load in the radial direction as described above. In addition, the suction inlet a, where an eccentric load caused by uneven flow is easily generated, is positioned closer to the bearing part 5 than the discharge outlet b where the flow is relatively uniform and hardly any eccentric load is generated. As a result, it is durable against an eccentric load to the rotating shaft 3 in the radial direction and can easily be enlarged in size because such enlargement requires no particular considerations such as enlarging and strengthening the parts around the rotating shaft 3 and the bearing part 5.

Furthermore, when inspecting the inside of the apparatus, since the inside of the apparatus can be exposed simply by removing the lightweight casing 1b, inspection can be done very easily as the bulkier and heavier casing 1a remains installed. In addition, the piping mounted onto the suction inlet a and the discharge outlet b can also be left mounted and it is not necessary to detach them from the casing 1a. Therefore inspections can be performed very easily and this also contributes to easy enlargement of the apparatus size.

Because the impeller 2 is integrated into a compact single part, it can be manufactured as an integral casting which contributes to simplification and cost reduction. This also facilitates size enlargement, with the larger size making possible a corresponding reduction in the rotation speed of the impeller that can reduce the rise in the temperature of the pumped liquid. In this way among others, it provides greater flexibility in selection for manufacturing and operation.

Moreover, this apparatus allows easy CIP cleaning and disassembly cleaning in order to meet sanitary specifications.

CIP cleaning of this apparatus can be easily and thoroughly performed because the casings 1a and 1b form a single integrated chamber without any partitions or bottlenecks. More specifically, liquid contact parts can be cleaned without leaving any shadows by pouring cleaning fluid from the suction inlet a and discharging it from the discharge outlet b, the exhaust outlet e, and a drain (not shown in the figure) while the apparatus is in operation.

Also, when performing disassembly cleaning of this apparatus, cleaning of the liquid contact parts of the impeller 2 and the casings 1a and 1b is easy because the casing can be easily and smoothly separated into 1a and 1b parts. After removing the casing 1b that is neither heavy nor bulky, the integrated impeller 2 unit can be easily pulled out from the rotating shaft 3 without interference from other components. Reassembly is easy as well.

This apparatus can be applied in a wide variety of areas including defoaming, antifoaming, or deaeration of food materials, oil, or chemicals, as well as production of pure water, ultra pure liquid, deoxygenated water for rust prevention, and other degassed water. It can also be used for mixing in a desired gas (such as ozone) after degassing. The large advantage of this apparatus in practical use is that it operates mechanically without using any chemical additives.

Embodiment 2

Figure 5:
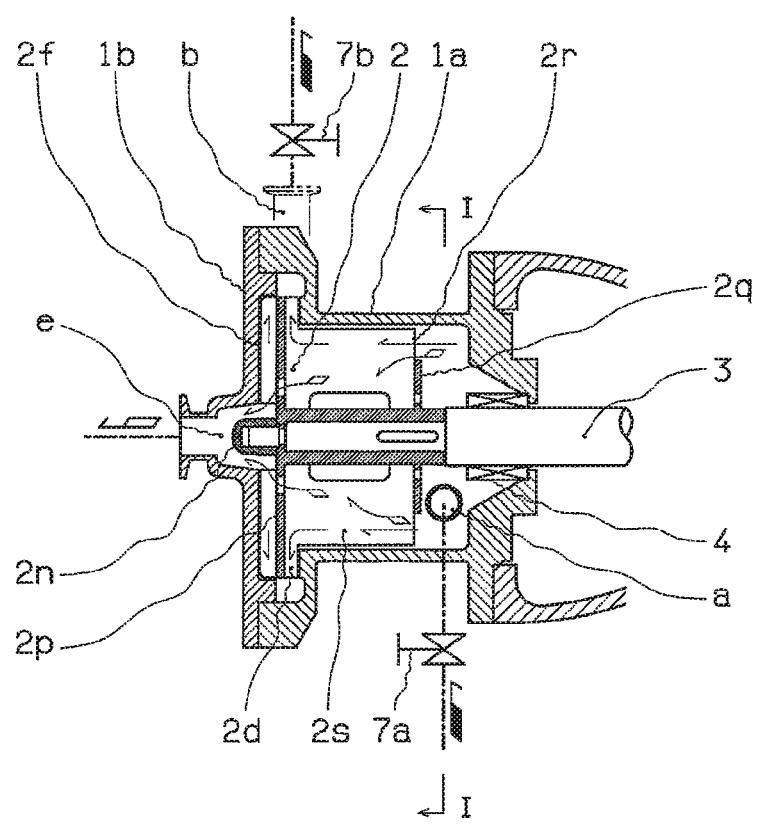
FIG. 5 is a vertical sectional view (partially a side view) of the second embodiment of the present invention.
Figure 6:
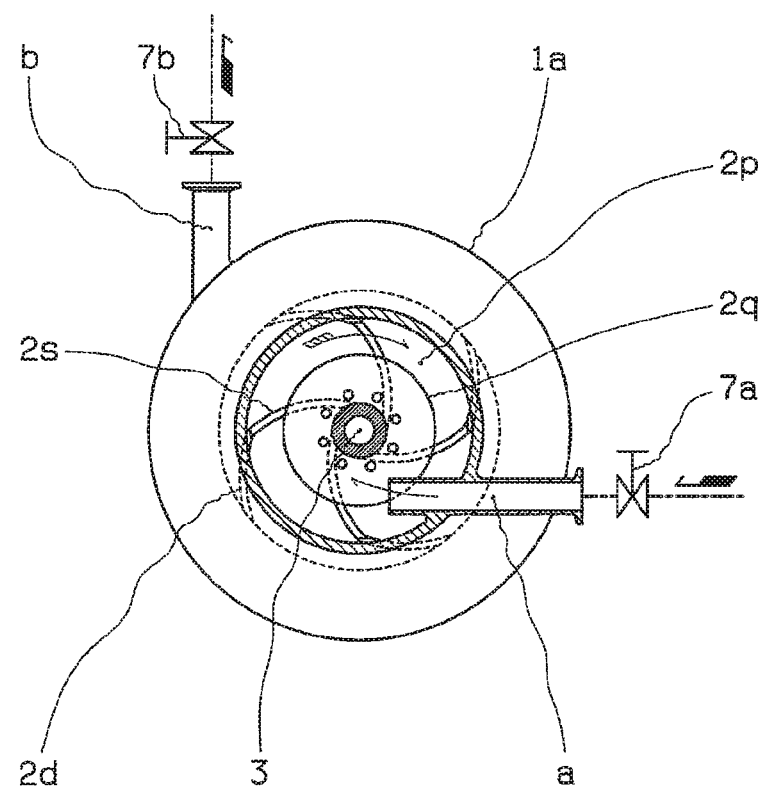
FIG. 6 is a sectional view along the line I-I in FIG. 5.

FIG. 5 shows the second embodiment, and FIG. 6 shows section I-I in FIG. 5.

In this embodiment, the opening for the suction inlet a to the inside of the casing 1a is disposed in a position inwardly apart from the inner peripheral wall of the casing 1a by a predetermined distance so as to improve degassing efficiency.

One of the important factors in improving the degassing efficiency of a gas-liquid separator is increasing the gas-liquid boundary area (the surface area where liquid is exposed to the negative pressure generated by the vacuum device). For this purpose, specific methods include enlarging the diameter of the annular boundary surface by throttling the inflow to reduce the radial thickness of the annular liquid layer generated by the centrifugal separation, or enlarging the casing 1a itself either in the radial direction or in the axial direction. However, the former method creates a problematic trade-off relationship with the maximum processable flow rate, and the latter method goes against compactization of the apparatus, and both methods are subject to limitations.

In this embodiment, as a more efficient method to increase the gas-liquid boundary area, a new approach is taken by focusing on the structure of the opening of the suction inlet a.

The liquid forcibly separated by centrifugal force forms a thin annular liquid layer on the inner peripheral wall of the casing 1a. If the suction inlet a simply opens on the inner peripheral wall of the casing 1a, the pumped liquid flowing in is blocked by the annular liquid layer and it can only merge into the annular liquid layer. But if the suction inlet a protrudes inward from the inner peripheral wall of the casing 1a by a predetermined distance and is closer to the center of rotation as illustrated in this embodiment, then at least a portion of the opening penetrates through the annular liquid layer and is exposed in the cavity area, enabling the pumped liquid to be dispersed in the cavity area without being blocked by the annular liquid layer. This results in a dramatic increase of the gas-liquid boundary area, and therefore the degassing performance can be improved.

Furthermore, when the dispersed pumped liquid subsequently merges into the annular liquid layer from the inside of the layer, the merging point is the point closest to the center of rotation in the layer and is rotating with the lowest peripheral speed. Therefore gas-liquid separation is performed gently without excessive agitation, fracture, or shear of the pumped liquid. This also can prevent changes in the properties of the pumped liquid due to a rise in the liquid temperature. This makes it possible to use the system with various kinds of liquids.

This embodiment also illustrates that, in regard to the impeller 2 referred to in the first embodiment, it is possible to more surely prevent liquid near the rotating shaft 3 from directly penetrating into the exhaust outlet e by providing an additional baffle member 2q on the impeller 2 at a position near the suction inlet a in addition to the baffle member 2p provided at a position near the exhaust outlet e.

The baffle member 2q has an outer diameter that is smaller than the inner diameter of the casing 1a as illustrated in the figure. This allows passage of the centrifuged liquid portion which moves toward the discharge outlet b as it forms a thin layer on the inner peripheral wall of the casing 1a, and effectively blocks only the liquid which tries to directly penetrate into the exhaust outlet e. On the other hand, the gas portion can pass through the baffle member 2q by flowing over its outer peripheral edge or by passing through a suitable number of holes or slits provided near the center of the rotating shaft 3.

Thus, by providing multiple baffle members according to the need, the liquid portion is more surely prevented from penetrating into the exhaust outlet e. This makes the vacuum device even safer, and allows it to powerfully suction and discharge the gas only.

The rest of the constitution and functions are the same as those of the first embodiment.

Embodiment 3

Figure 7:
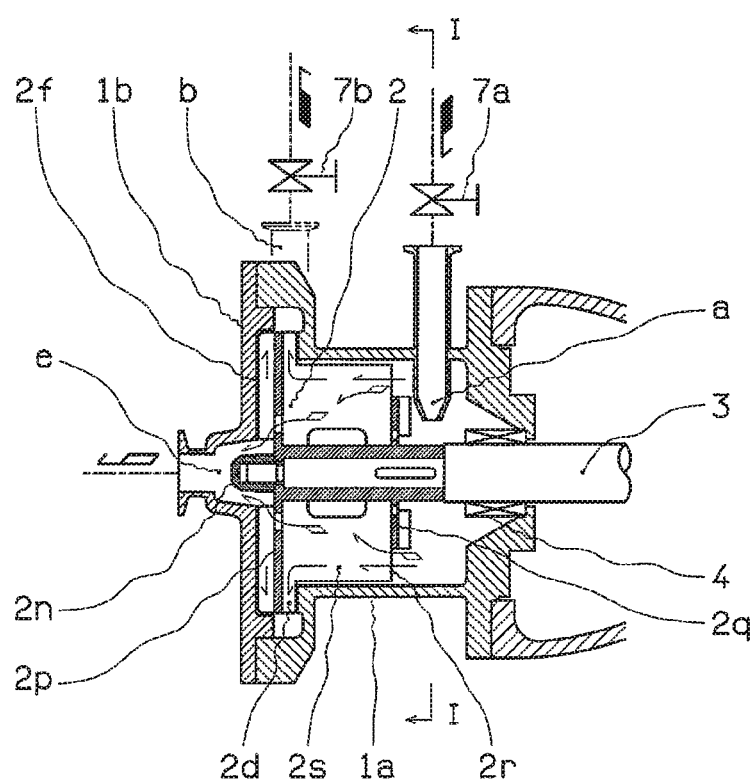
FIG. 7 is a vertical sectional view (partially a side view) of the third embodiment of the present invention.
Figure 8:
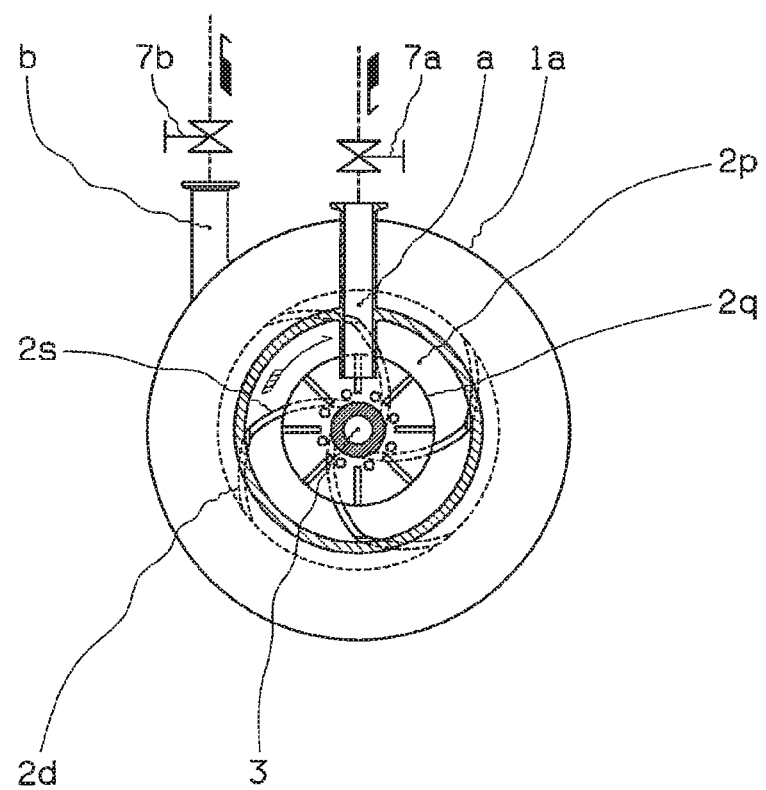
FIG. 8 is a sectional view along the line I-I in FIG. 7.

FIG. 7 shows the third embodiment, and FIG. 8 shows section I-I in FIG. 7.

In this embodiment, the suction inlet a in the apparatus of the second embodiment is modified such that its opening is formed in a straight nozzle or spray nozzle shape. This shape enables the pumped liquid to be dispersed in the cavity area more easily, further increasing the gas-liquid boundary area and improving the degassing efficiency.

This nozzle or spray can also function as a throttle for the pumped liquid.

As shown in the figure, the baffle member 2q can be suitably provided with small vanes to enhance centrifugal separation of the pumped liquid.

The rest of the constitution and functions are the same as those of the second embodiment.

Embodiment 4

Figure 9:
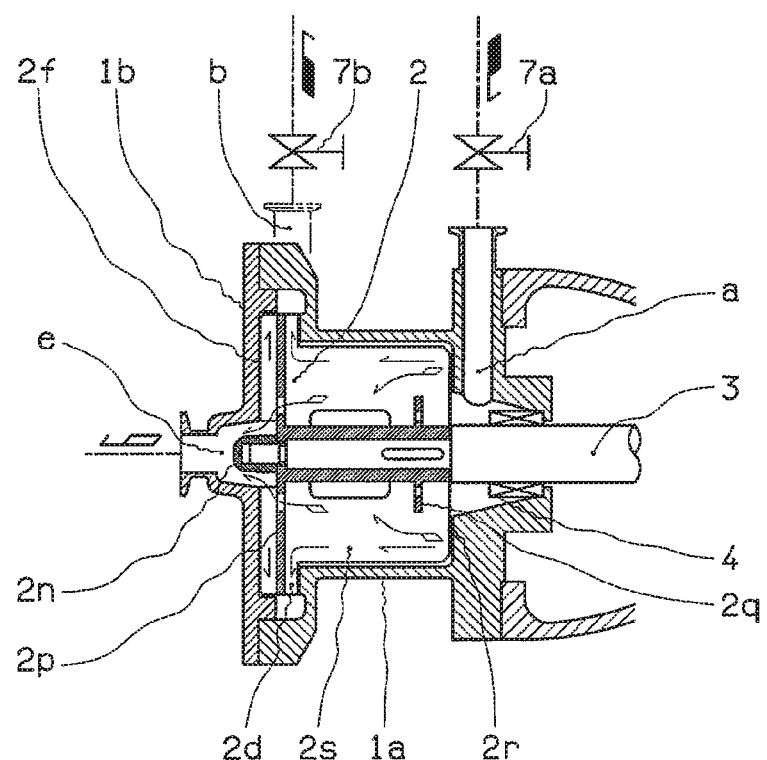
FIG. 9 is a vertical sectional view (partially a side view) of the fourth embodiment of the present invention.

FIG. 9 shows the fourth embodiment.

In this embodiment, the suction inlet a in the apparatus of the third embodiment is modified such that its passage runs through a bored hole in the body of the casing 1a and opens at a position inwardly apart from the inner peripheral wall of the casing 1a by a predetermined distance. This figure shows a typical example with the opening of the suction inlet a located in a position near the shaft sealing part 4 of the casing 1a where the rotating shaft 3 penetrates.

When the opening of the suction inlet a is situated at a position very close to the center of rotation as in this embodiment, the opening penetrates through the annular liquid layer generated by gas-liquid centrifugal separation and is sufficiently exposed in the cavity area, enabling the pumped liquid to be dispersed more freely and further improving the degassing performance.

Because the passage leading to the opening of the suction inlet a is built into the body of the casing 1a, it does not interfere with the rotating flow of the annular liquid layer. This keeps the flow of the annular liquid layer very smooth and reduces disturbance. Furthermore, when the dispersed pumped liquid subsequently merges into the annular liquid layer from the inside of the layer, the merging point is the point closest to the center of rotation in the layer and is rotating with the lowest peripheral speed. Therefore the gas-liquid separation is performed gently without excessive agitation, fracture, or shear of the pumped liquid, and allows the system to be used with various kinds of liquids.

It is preferable that the internal opening of the suction inlet a is formed in a shape that facilitates internal cleaning. This embodiment shows one such example with an opening that is formed in a cone shape which prevents accumulation of the cleaning fluid. In addition, the flow path from the suction inlet a to the opening is formed winding into the opening from a tangential direction so that the cleaning fluid injected from the suction inlet a is whirled in the opening and spreads into every corner during the CIP cleaning process.

The rest of the constitution and functions are the same as those of the third embodiment.

Embodiment 5

Figure 10:
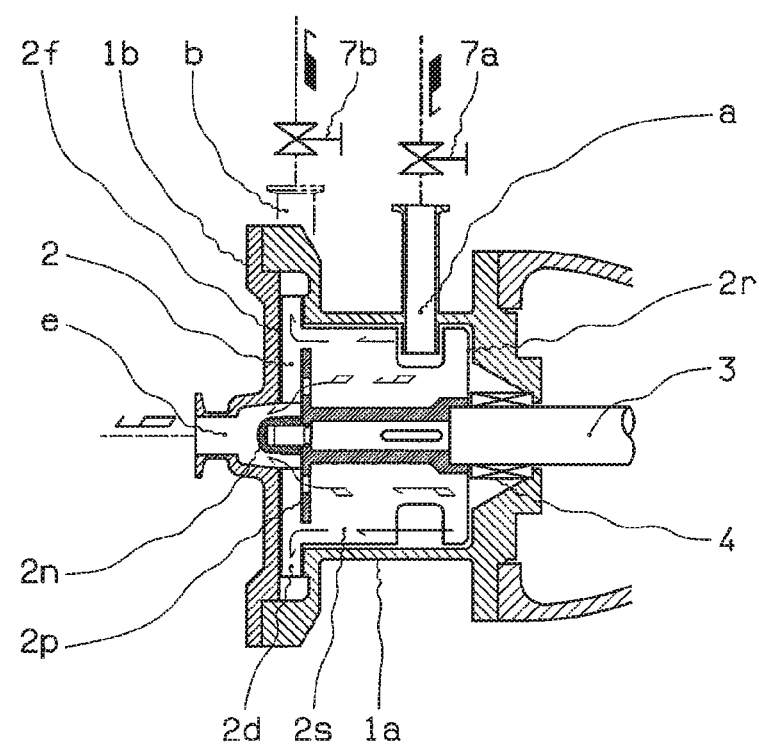
FIG. 10 is a vertical sectional view (partially a side view) of the fifth embodiment of the present invention.

FIG. 10 shows the fifth embodiment.

In this embodiment, the part of impeller 2 facing the opening of the suction inlet a, which is disposed in a position inwardly apart from the inner peripheral wall of the casing 1a by a predetermined distance, is provided with notches so as not to obstruct the inflow of the pumped liquid. The shape of this impeller part facing the suction inlet a also promotes dispersal of the pumped liquid. These changes result in improved degassing efficiency.

By narrowing the gap between the opening of the suction inlet a and the impeller 2 to a suitable clearance, it is also possible to break up foreign material present in the liquid between these two parts.

Furthermore, the figure shows an example in which the baffle member 2p, which also functions as a shroud, is located in a position where the pumped liquid passes just before flowing into the discharge impeller part 2d. Because the gap between its outer periphery and the inner peripheral wall of the casing 1a corresponds to the radial thickness of the annular liquid layer generated by centrifugal separation, only the liquid portion of the annular liquid layer is fed to the discharge outlet b. The gas portion is discharged through the holes or slits provided near the center of the rotating shaft 3. As a result, reliable separation of the gas and liquid can be achieved.

The rest of the constitution and functions are the same as those of the first embodiment and the third embodiment.

Embodiment 6

Figure 11:
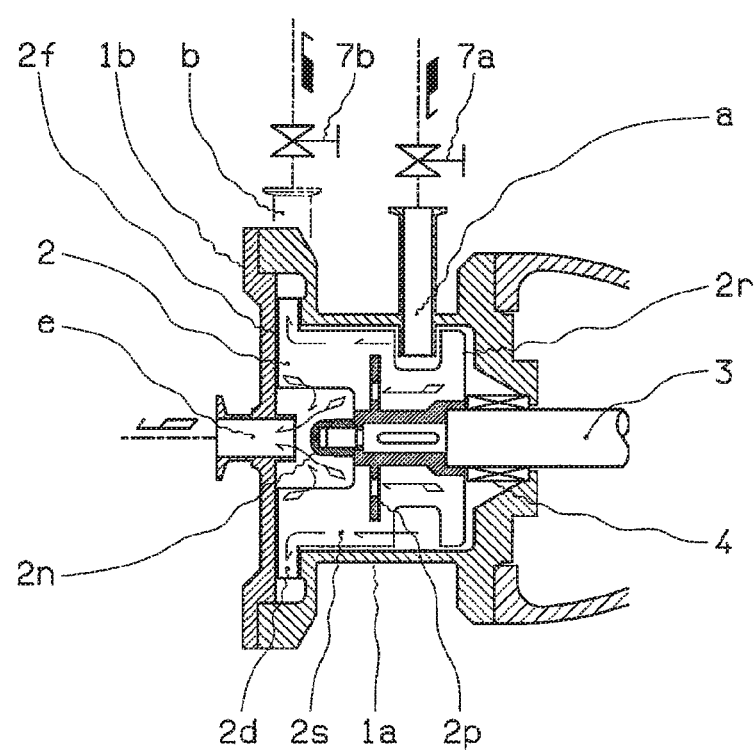
FIG. 11 is a vertical sectional view (partially a side view) of the sixth embodiment of the present invention.

FIG. 11 shows the sixth embodiment.

In this embodiment, the exhaust outlet e in the apparatus of the fifth embodiment is modified such that its opening to the inside of the casing 1b is disposed in a position inwardly apart from the inner wall of the casing 1b by a predetermined distance.

In this embodiment, as with the foregoing embodiments, even when the pumped liquid is mixed into the cavity gas near the center of rotation, if the liquid portion tries to penetrate into the exhaust outlet e, the liquid portion is blocked and shaken off by the baffle member 2p, preventing it from penetrating. The liquid portion is also shaken off by the centrifugal force around the axial end 2f, and because the sliding clearance with the casing 1b on the axial end 2f is small, the liquid cannot penetrate from this area either.

However at points extremely close to the center of the rotating shaft 3, there is the possibility that liquid droplets may remain due to insufficient centrifugal force produced by rotation, or due to condensation of floating mist. So, as a precautionary measure, the opening of the exhaust outlet e protrudes inward from the inner wall of the casing 1b, forming a protective wall that prevents liquid droplets that remain near the rotating shaft 3 from passing along the inner wall of the casing 1b and penetrating the exhaust outlet e.

The rest of the constitution and functions are the same as those of the fifth embodiment.

Embodiment 7

Figure 12:
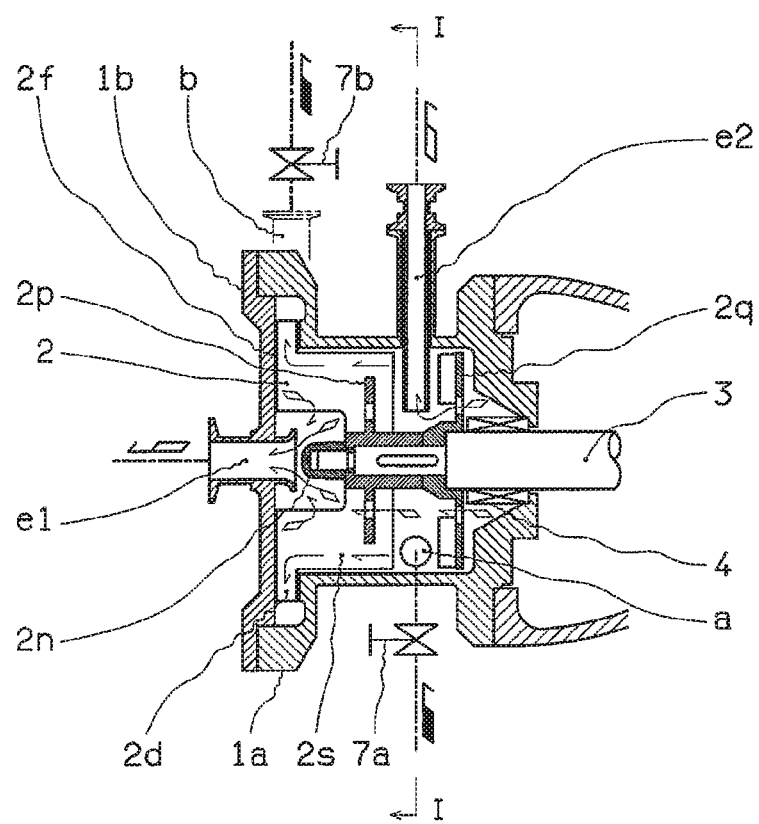
FIG. 12 is a vertical sectional view (partially a side view) of the seventh embodiment of the present invention.
Figure 13:
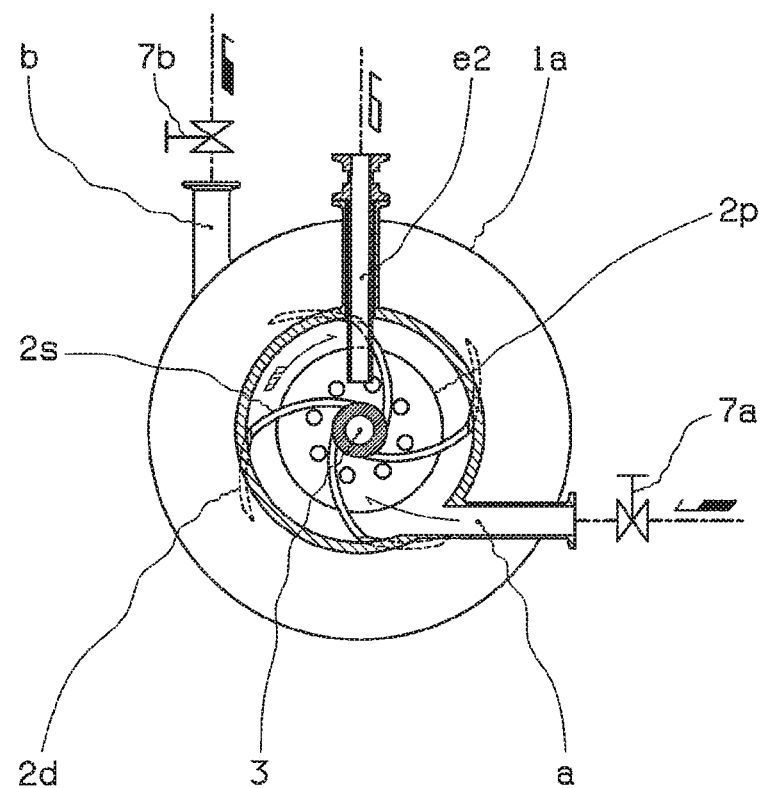
FIG. 13 is a sectional view along the line I-I in FIG. 12.

FIG. 12 shows the seventh embodiment, and FIG. 13 shows section I-I in FIG. 12.

In this embodiment, the exhaust outlet in the apparatus of the sixth embodiment is modified such that an exhaust outlet e2 is provided near the shaft sealing part 4 of the casing 1a in addition to the exhaust outlet e1. This is an example of improving degassing efficiency by providing two or more exhaust outlets.

For the exhaust outlet e2 in the figure, it is desirable that its opening be extended to a point as close as possible to the rotating shaft center so as to surely collect cavity gas near the center of rotation. In order to avoid interference with a nearby parts (such as the baffle member 2q shown in the figure) during disassembly, the structure allows it to be inserted into and pulled out from the casing 1a, as illustrated. The exhaust outlet e2 is connected to the vacuum device not shown in the figure.

The rest of the constitution and functions are the same as those of the sixth embodiment.

Embodiment 8

Figure 14:
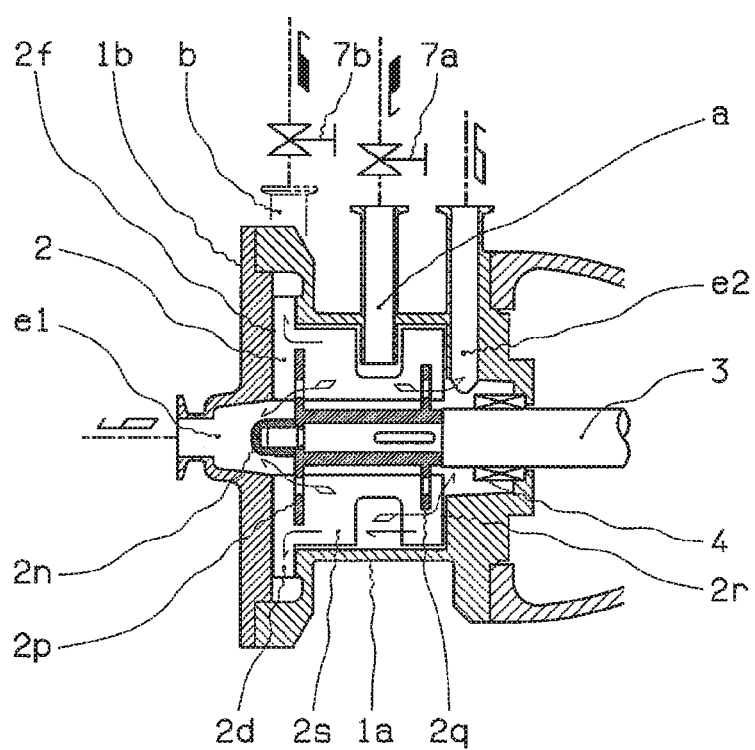
FIG. 14 is a vertical sectional view (partially a side view) of the eighth embodiment of the present invention.

FIG. 14 shows the eighth embodiment.

In this embodiment, the exhaust outlet in the apparatus of the fifth embodiment is modified such that an exhaust outlet e2 is provided near the shaft sealing part 4 of the casing 1a in addition to the exhaust outlet e1. The structure around the exhaust outlet e2 is also made similar to that of the exhaust outlet e1. That is, the baffle member 2q is provided near the axial end 2r which is on the opposite side to the axial end 2f. At the same time, the axial end 2r is formed to slide along the inner wall of the casing 1a while maintaining the smallest possible predetermined clearance. Also, an opening is formed near the center of the casing 1a opposite the sliding axial end 2r for discharging the cavity gas generated from the gas-liquid separation, and the opening is connected to the vacuum device, not shown in the figure, via exhaust outlet e2.

Due to this structure, even when the pumped liquid is mixed into the cavity gas near the center of rotation, if the liquid portion tries to penetrate into the exhaust outlet e2, the liquid portion is blocked and shaken off by the baffle member 2q, preventing it from penetrating. The liquid portion is also shaken off by the centrifugal force around the axial end 2r, and because the sliding clearance with the casing 1a on the axial end 2r is small, the liquid cannot penetrate from this area either. Therefore, the pumped liquid does not flow into the vacuum device during operation, the vacuum device is safe, and it can powerfully suction and discharge the gas only. Thus, the degassing efficiency is improved by providing exhaust outlets at multiple locations.

As to the baffle member 2q, the figure shows that the outer diameter is set so that the impeller 2 can be easily pulled out from the rotating shaft 3 without any interference with the suction inlet a during disassembly of this apparatus.

Meantime, the exhaust outlet e2 can also function as a cleaning fluid inlet for internal cleaning around the shaft sealing part 4 when performing CIP cleaning of this apparatus. For this purpose, the flow path from the exhaust outlet e2 to the opening is formed winding into the opening from a tangential direction, as illustrated as an example, so that the cleaning fluid is whirled in the opening of the exhaust outlet e2 and spreads into every corner.

The rest of the constitution and functions are the same as those of the fifth embodiment.

Embodiment 9

Figure 15:
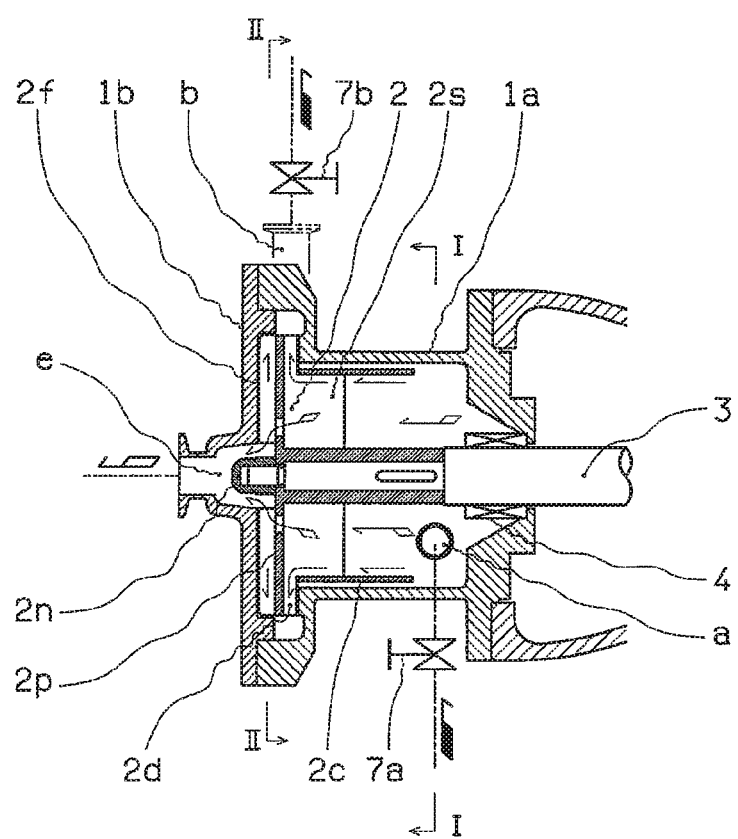
FIG. 15 is a vertical sectional view (partially a side view) of the ninth embodiment of the present invention.
Figure 16:
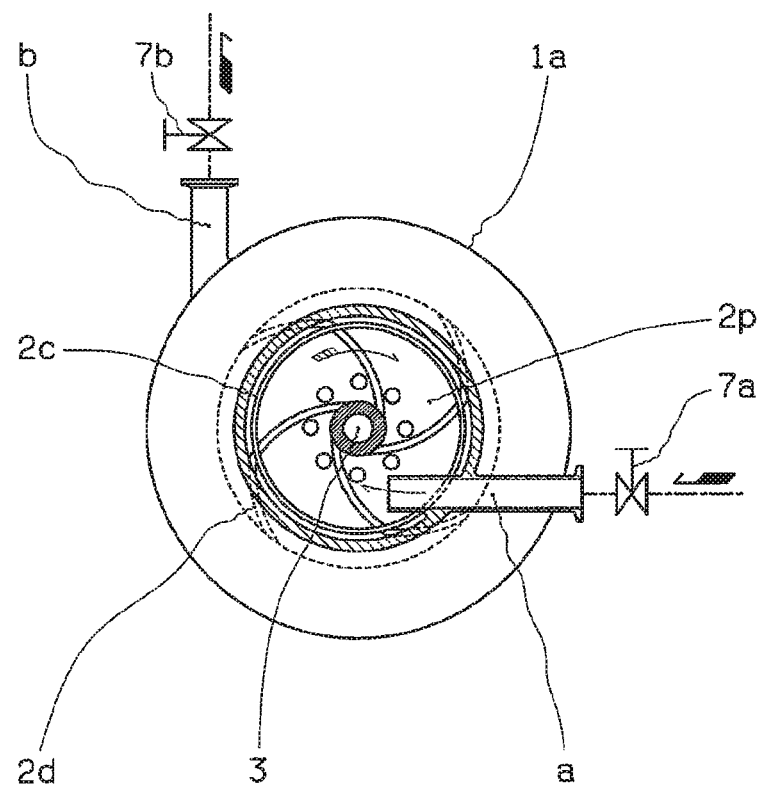
FIG. 16 is a sectional view along the line I-I in FIG. 15.
Figure 17:
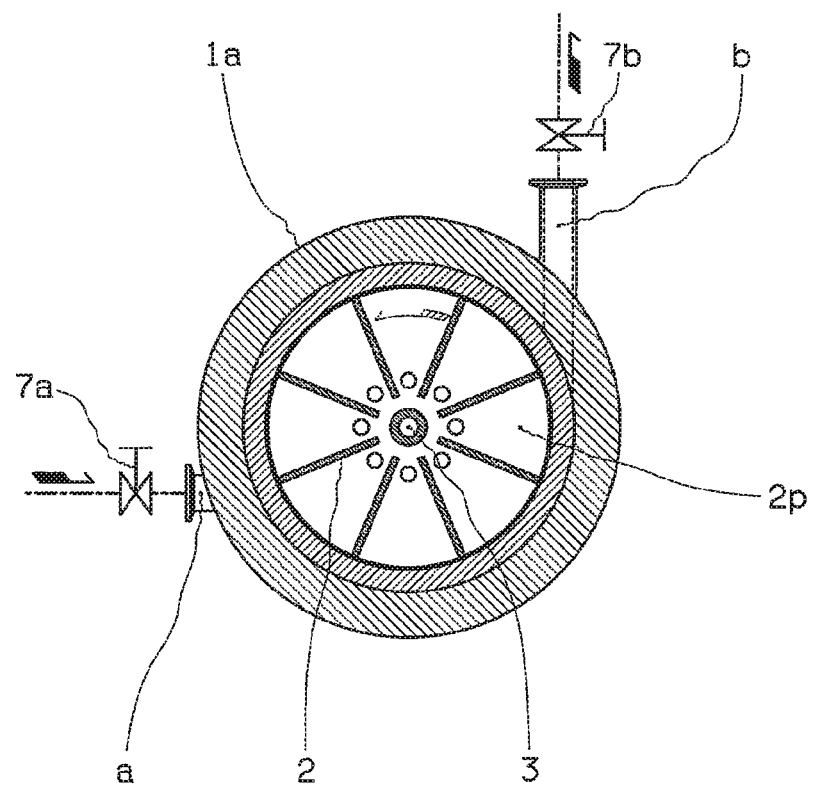
FIG. 17 is a sectional view along the line II-II in FIG. 15.

FIG. 15 shows the ninth embodiment, FIG. 16 shows section I-I in FIG. 15, and FIG. 17 shows section II-II in FIG. 15.

In this embodiment, the impeller 2 in the apparatus of the second embodiment is modified such that a cylindrical member 2c, coaxial with the impeller 2, is attached to the impeller 2 at a position opposite the part between the suction inlet a and the discharge outlet b of the casing 1a.

Due to this structure, the pumped liquid flowing in from the suction inlet a is pushed against the inner peripheral wall of the rotating cylindrical member 2c. At the same time, the liquid is given a rotational force from the inner peripheral wall due to flow resistance, separating out the gas by centrifugal force. Only the liquid is then pushed out of the discharge outlet b by the discharge impeller part 2d. In other words, the gas-liquid separation is performed gently without excessive agitation, fracture, or shear by means of friction with the edge of the impeller 2 and the inner periphery of the casing 1a. In the gas-liquid separation for liquids such as food materials, particle-containing liquids, and foaming liquids, excess foaming due to excessive agitation of the pumped liquid and destruction of particles due to excessive fracture or shear is undesirable in some cases. Gentle gas-liquid separation is made possible by using the apparatus in this embodiment, which makes it quite favorable for handling various kinds of liquids.

Convex parts, ribs, or vanes may be provided inside the cylindrical member 2c for promoting forced rotation of the pumped liquid. For example, the separation impeller part 2s also functions to support the cylindrical member 2c in the figure. Forced rotation of the liquid is boosted and centrifugal force for gas-liquid separation is enhanced by extending this supporting part 2s so that impeller vanes are structured all over the inside of the cylindrical member 2c. The height of the vanes may also be selected suitably.

The cylindrical member 2c may be installed in multiple rows so that gas can be suctioned more effectively by increasing the boundary area of liquid and gas for gas-liquid separation. A means of increasing the boundary area (such as machining or attaching material to produce porosity and roughness) may also be provided on these cylindrical members.

As to the impeller 2, an example of employing a radial type vane instead of a volute type vane as the vane type for the impeller part facing the inner wall of the casing 1b is shown in the figure.

The rest of the constitution and functions are the same as those of the second embodiment.

Embodiment 10

Figure 18:
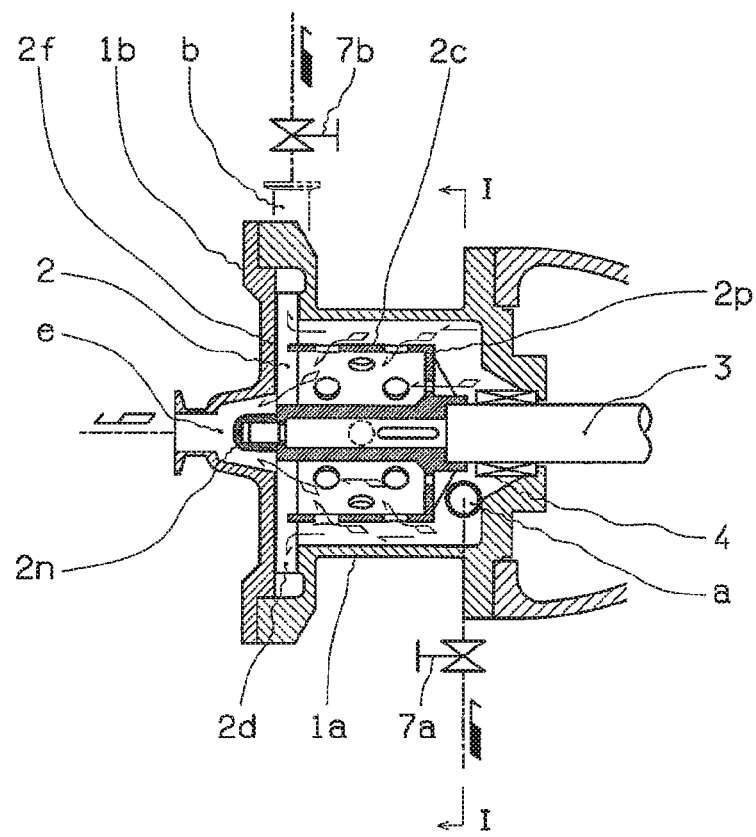
FIG. 18 is a vertical sectional view (partially a side view) of the tenth embodiment of the present invention.
Figure 19:
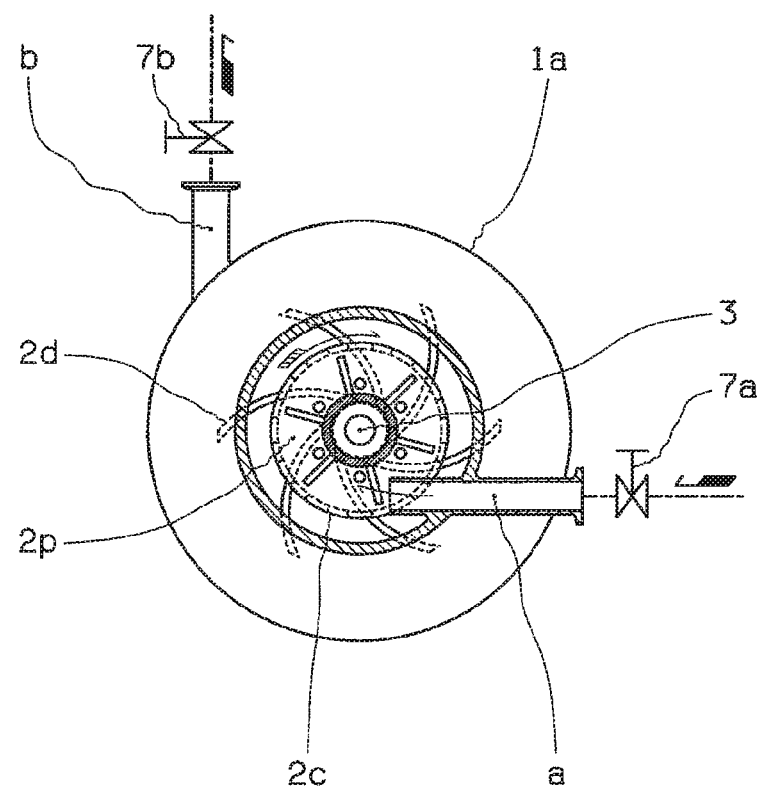
FIG. 19 is a sectional view along the line I-I in FIG. 18.

FIG. 18 shows the tenth embodiment, and FIG. 19 shows section I-I in FIG. 18.

In this embodiment, the cylindrical member 2c in the apparatus of the ninth embodiment is deformed such that, while the pumped liquid flowing in from the suction inlet a is moving between the casing 1a and the cylindrical member 2c toward the discharge outlet b, the liquid is given a rotational force from the outer peripheral wall of the rotating cylindrical member 2c due to flow resistance, separating out the gas by centrifugal force. Only the liquid is then pushed out of the discharge outlet b by the discharge impeller part 2d. Thus, gentle gas-liquid separation without excessive stress on the pumped liquid is made possible.

In this embodiment, the entire cylindrical member 2c also functions as the baffle member 2p. If the centrifugally separated liquid portion tries to penetrate into the exhaust outlet e, the liquid portion is blocked and shaken off by the baffle member 2p, preventing it from penetrating. The gas portion, not influenced by centrifugal force, can enter the exhaust outlet e by passing through a suitable number of holes or slits provided on the baffle member 2p. This enables powerful suction and discharge of the gas only.

Suitable small vanes can be attached to the baffle member 2p so as to promote the centrifugal separation of the pumped liquid, as illustrated in the figure.

The rest of the constitution and functions are the same as those of the ninth embodiment.

Embodiment 11

Figure 20:
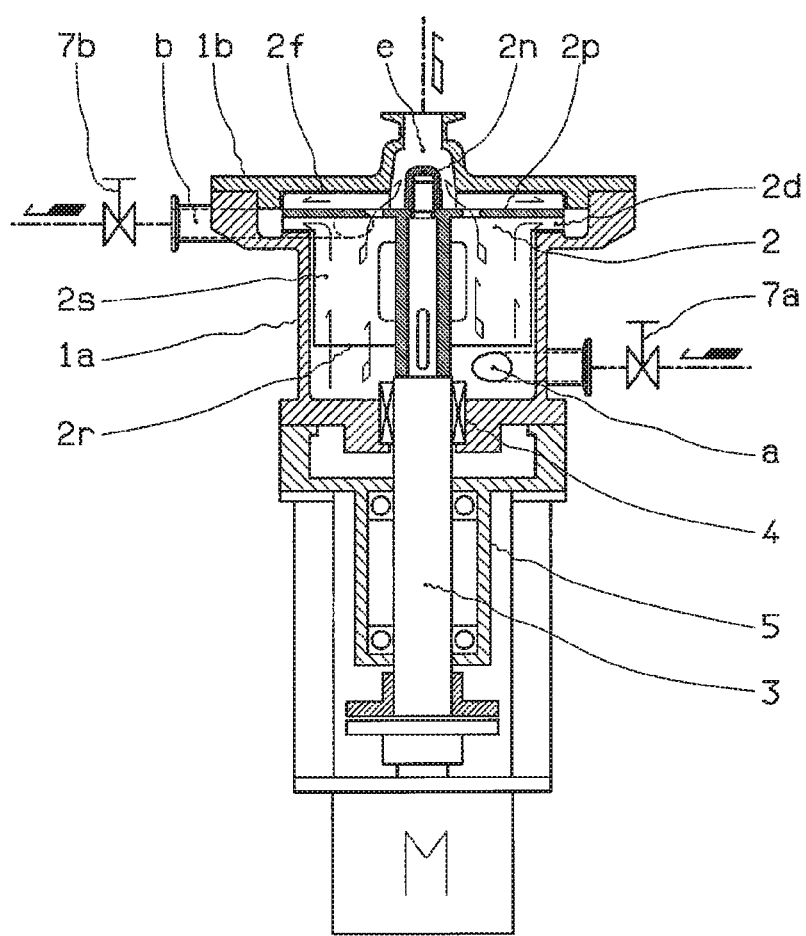
FIG. 20 is a vertical sectional view (partially a side view) of the eleventh embodiment of the present invention.

FIG. 20 shows the eleventh embodiment.

In each foregoing embodiment, the horizontal type rotating shaft 3 is illustrated for convenience of explanation, however a horizontal, vertical or inclined type may be selected, as the type of the rotating shaft is not restricted to the horizontal type. As one good example, a vertical type with the exhaust outlet e on the upper side and the rotating shaft 3 in the vertical direction is shown in this eleventh embodiment.

This structure has various advantages including uniform gas-liquid separation operation with less bias to the gas-liquid boundary area due to the influence of gravity; utilization of the gas-liquid separation effect due to the spontaneous flotation of gas bubbles; and easy prevention of liquid penetration into the exhaust outlet e since it is located on the upper side.

The rest of the constitution and functions are the same as those of the foregoing embodiments.

Embodiment 12

Figure 21:
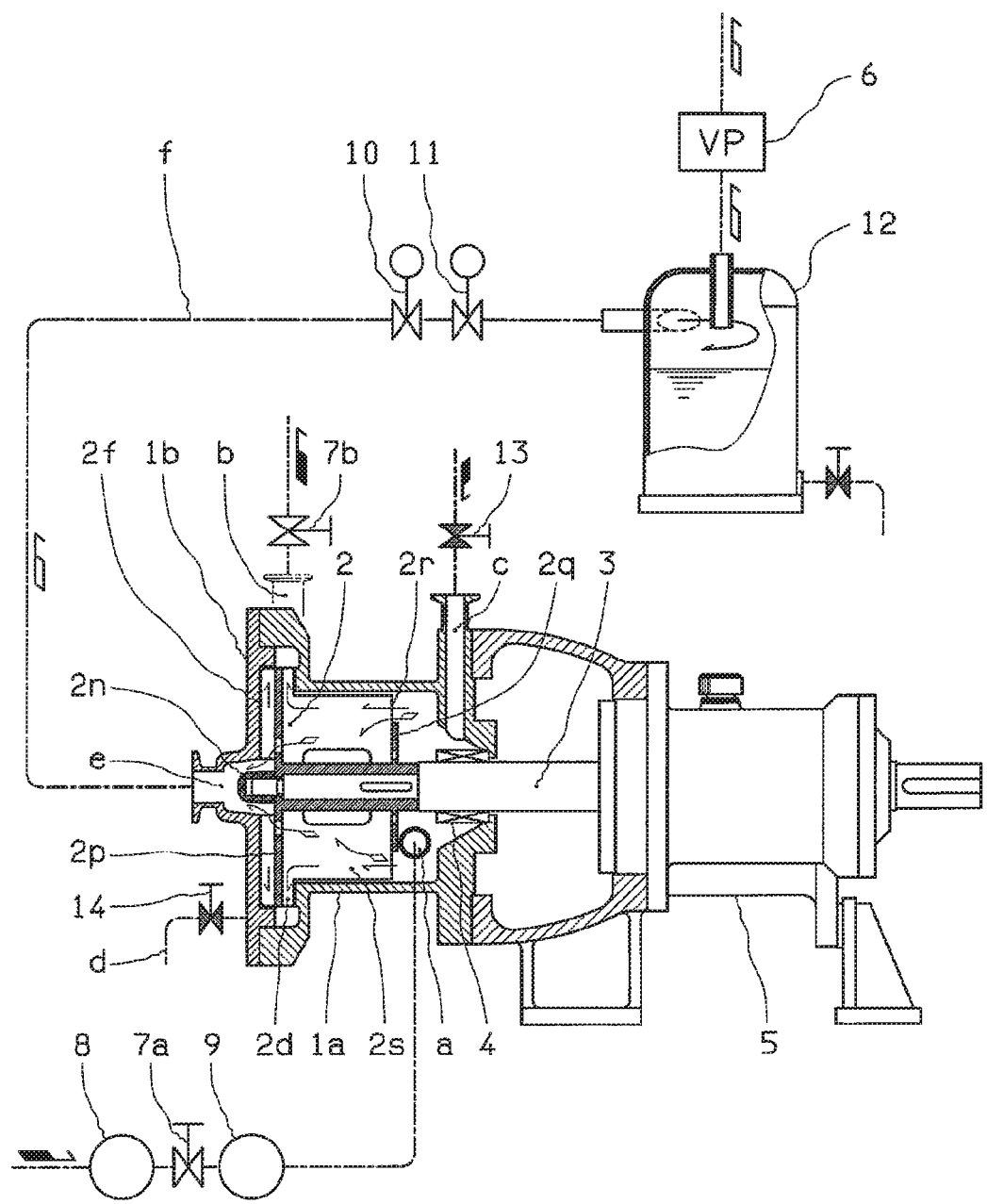
FIG. 21 is a vertical sectional view (partially a side view) of the twelfth embodiment of the present invention.

The twelfth embodiment in FIG. 21 shows the construction and operation of the apparatus of the present invention in more detail, taking the apparatus in the second embodiment as a typical example.

This embodiment shows that a heating means 8 may be inserted in the passage of the suction inlet a because increasing the pumped liquid temperature helps improve the gas-liquid separation efficiency. A suitable type of heating means 8 may be selected, such as a heater type or a heat-exchanger type.

The figure also shows that a cavitation generating means 9 may be inserted in a suitable position on the pumped liquid passage. Generating a suitable degree of cavitation increases the gas-liquid separation efficiency by promoting the separation of dissolved gas in the liquid. In addition, by utilizing the impact of cavitation foam collapse, various effects can be expected, such as removal of foreign material stuck inside the apparatus, sterilization, deodorization, atomization of particles in the liquid, destruction of impurities in the liquid, and water cluster dissolution. A suitable cavitation generating method may be selected, such as an ultrasonic wave generating type or a rotating propeller type. The cavitation generating means 9 may also be positioned behind the discharge outlet b, especially when used for sterilization.

Besides installing a cavitation generating means 9, the impeller 2 itself may be formed in a shape that promotes cavitation (vane shape such as a tabular, wedge-shaped, or convexo-concave shape which can cause pressure fluctuation through vortex and turbulent flow) as an alternative cavitation generating method.

For the apparatus of the present invention, because penetration of the pumped liquid through the exhaust passage f from the exhaust outlet e to the vacuum device 6 is adequately prevented by the separation impeller part and the baffle member on the impeller 2, the exhaust passage f may be connected directly to the vacuum device 6 with practically no problems. However, it is more preferable to provide a protection means which prevents passing of the pumped liquid in the unlikely event that the pumped liquid enters the exhaust passage f. As an example, protection means 10, 11, and 12, which allow gas passage but prevent liquid passage, are installed in the exhaust passage f in this embodiment.

More specifically, a slow operation valve 10 with delayed opening based on pump activation, and a quick operation valve 11 which closes immediately when the pump is stopped, are inserted in series in the exhaust passage f. The delayed valve opening operation of the slow operation valve 10 prevents the pumped liquid from being suctioned by the vacuum device 6 at the moment when this apparatus is activated. The quick valve closing operation of the quick operation valve 11 prevents the pumped liquid from being suctioned by the vacuum device 6, and prevents operation fluid of the vacuum device 6 being suctioned by the apparatus, at the moment when the apparatus is turned off. In this figure, the slow operation valve 10 and the quick operation valve 11 which are electronically controlled for the opening and closing timing (illustration of the control system is omitted) are illustrated for ease of explanation. The slow operation valve 10 and the quick operation valve 11 may be formed in one combined valve which is controlled to perform delayed valve opening and immediate valve closing.

A liquid holding tank 12 is installed in the exhaust passage f as another protection means The liquid holding tank 12, as illustrated, is provided with an inlet and an outlet at the top of the tank so that the pumped liquid that has penetrated via the exhaust passage f accumulates at the bottom of the tank and only the gas can pass. The passage at the inlet is tangential to the tank inner wall to produce a centrifugation effect for improving the gas-liquid separation performance. A drain is provided at the bottom of the tank for discharging the accumulated liquid which can be suitably discharged manually or automatically.

Additional protection means, such as a float valve which closes the exhaust passage f forcibly when the liquid level in the exhaust passage f rises, may also be installed in the exhaust passage f. These protection mechanisms can prevent the passage of the pumped liquid through the exhaust passage f even if the pumped liquid enters the exhaust passage f, ensuring the safety of the apparatus. Each of these protection mechanisms has different effective functions, and it is permissible to employ only part of them.

Furthermore, various means may be installed in the flow passage for automatic control of at least one of flow rate, pressure and temperature. This makes the apparatus adaptable to various operating conditions and various application needs. For example, a constant flow rate of the passing fluid can be maintained by automatic control of the throttle means 7a on the suction side and the throttle means 7b on the discharge side.

The structure that facilitates easy CIP cleaning and disassembly cleaning is also illustrated in this embodiment.

An interior cavity space is provided near the shaft sealing part 4 of the casing 1a where the rotating shaft 3 penetrates the casing, and a cleaning fluid inlet c is provided so that the inside of the apparatus can be cleaned without disassembly.

The shape of the cavity near the shaft sealing part 4 through the cleaning fluid inlet c can be shaped such that cleaning fluid does not readily accumulate in it. In this embodiment, a cone shaped type is illustrated as an example. If the cleaning fluid inlet c is positioned near the reduced diameter area of the cavity, the added cleaning fluid flows from the reduced diameter area to the expanded diameter area and discharges completely to a drain d. If the cleaning fluid inlet c is structured so that the passage winds from a direction tangential to the cavity, the cleaning fluid is discharged after cleaning the entire inside of the cavity evenly, further improving the cleaning effect.

CIP cleaning of this apparatus can be easily and thoroughly performed because the casings 1a and 1b form a single integrated chamber without any partitions or bottlenecks. More specifically, internal cleaning can be performed by pouring the cleaning fluid into openings such as the suction inlet a and the cleaning fluid inlet c, and discharging it from openings such as the discharge outlet b, the exhaust outlet e, and the drain d while the apparatus is in operation. In this way, liquid contact parts can be cleaned without leaving any shadows. The operation is easier if valves 13 and 14 are installed to the cleaning fluid inlet c and the drain d respectively and are closed except during cleaning.

Also, when performing disassembly cleaning of this apparatus, cleaning of the liquid contact parts of the impeller 2 and the casings 1a and 1b is easy because the casing can be easily and smoothly separated into 1a and 1b parts. After removing the casing 1b that is neither heavy nor bulky, the integrated impeller 2 unit can be easily pulled out from the rotating shaft 3 without interference from other components. Reassembly is easy as well.

The rest of the constitution and functions are the same as those of the second embodiment.

Each of the above installed mechanisms is obviously applicable to all the aforementioned embodiments of the present invention as well as this embodiment.

Embodiment 13

Figure 22:
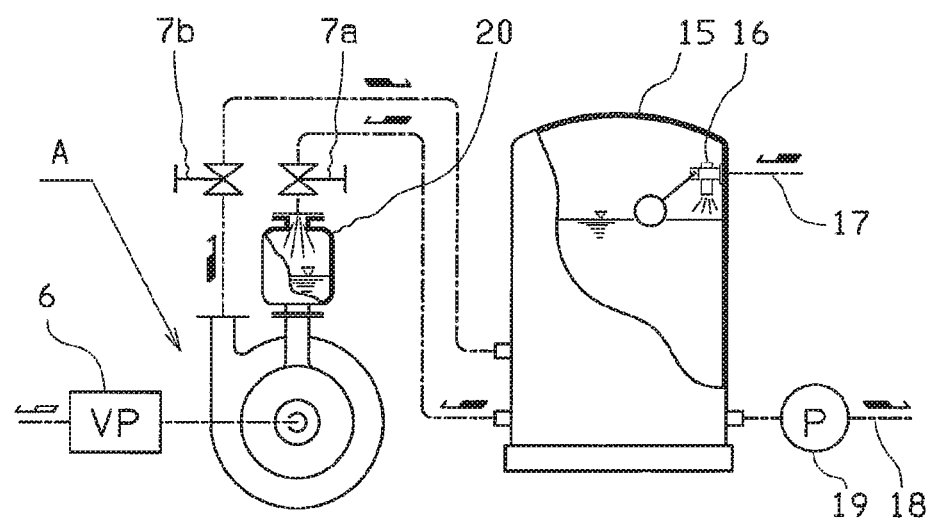
FIG. 22 is an explanation drawing (partially a sectional view) of the thirteenth embodiment of the present invention.

The thirteenth embodiment in FIG. 22 shows an example of a degassing system with the gas-liquid separator A from the present invention built into it.

In this embodiment, discharged liquid from the discharge outlet on the gas-liquid separator A returns to the suction inlet via a storage tank 15. This method is useful solution in the event that the gas-liquid separation performance is insufficient after one cycle of separation, especially during advanced degassing processes. This method provides the specified degassing performance by circulating the processing liquid to repeat gas-liquid separation. This circulated liquid can be returned to the suction inlet directly from the discharge outlet without going through the storage tank 15. However the circulation returns via the storage tank 15 in this embodiment for easy flow rate control.

The level of the liquid flowing from an inlet piping 17 into the storage tank 15 is controlled at a nearly constant level by a float valve 16, shown in the figure, or by a control valve, not shown in the figure. The liquid in the storage tank 15 is returned to the storage tank 15 again through the gas-liquid separator A. It is then mixed with the liquid newly flowing from the inlet piping 17, reducing the overall gas inclusion amount in the storage tank 15. The degassed liquid stored in the storage tank 15 is pumped from an outlet piping 18 to the point of use by a booster pump 19. An additional storage tank and a mechanism or equipment for automatic control of flow rate, pressure or temperature may be suitably installed.

Also, this figure illustrates that a liquid accumulation means 20 may be installed in the decompressed passage between the throttle means 7a and the suction inlet of the gas-liquid separator A. This is one supplementary means of increasing the boundary area of liquid and gas for gas-liquid separation to improve degassing efficiency when the gas-liquid separator A is compact and the boundary area is small. The container inlet of the liquid accumulation means 20 may be formed in a suitable spray shape, and porous or rough material may be provided inside the container to further increase the boundary area.

Embodiment 14

Figure 23:
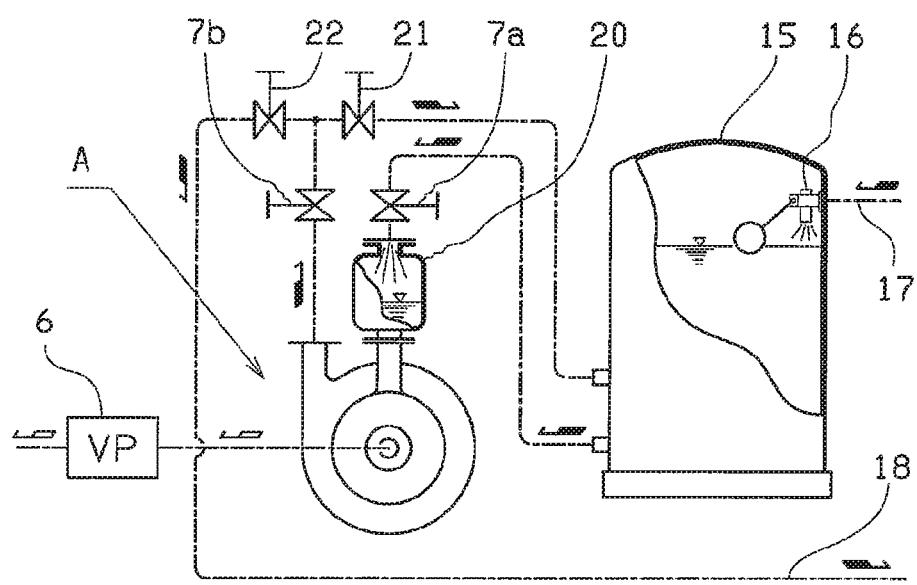
FIG. 23 is an explanation drawing (partially a sectional view) of the fourteenth embodiment of the present invention.
Figure 24:
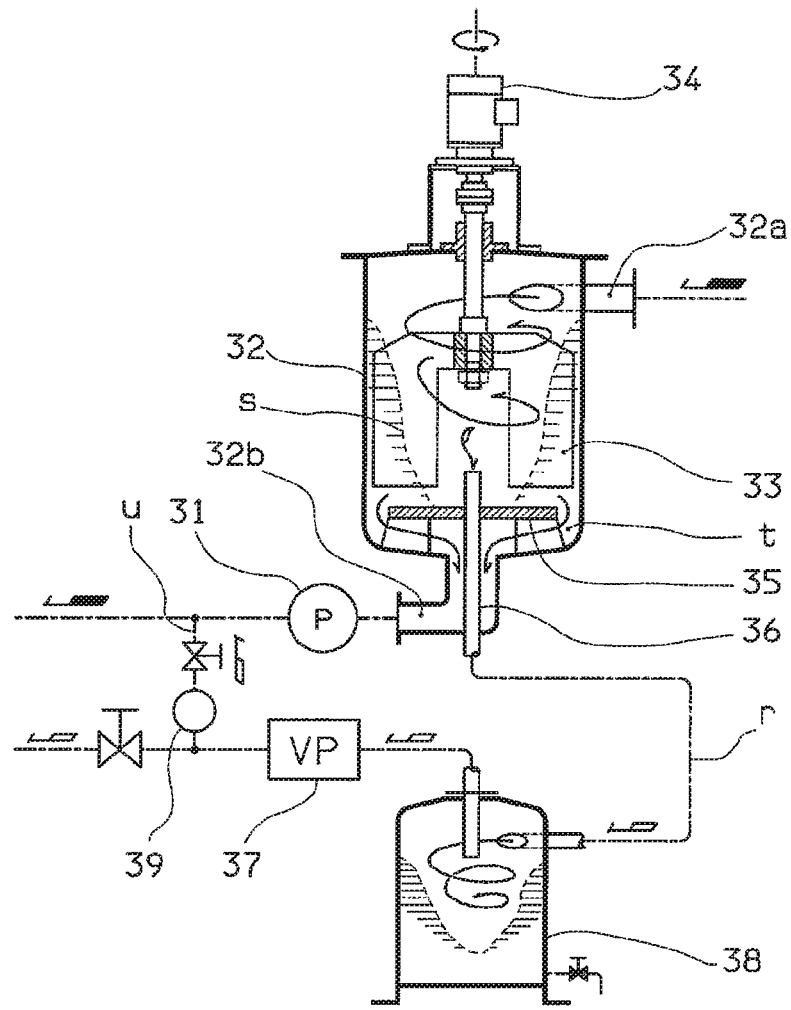
FIG. 24 is a vertical sectional view (partially a side view) of an example of the prior art.
Figure 25:
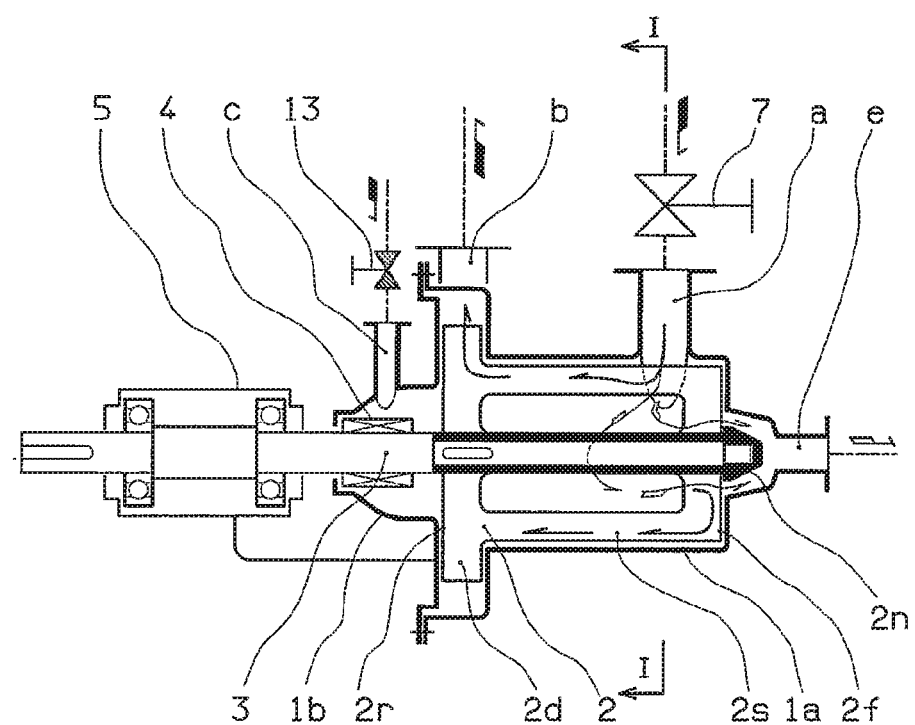
FIG. 25 is a vertical sectional view (partially a side view) of an example of the prior art.
Figure 26:
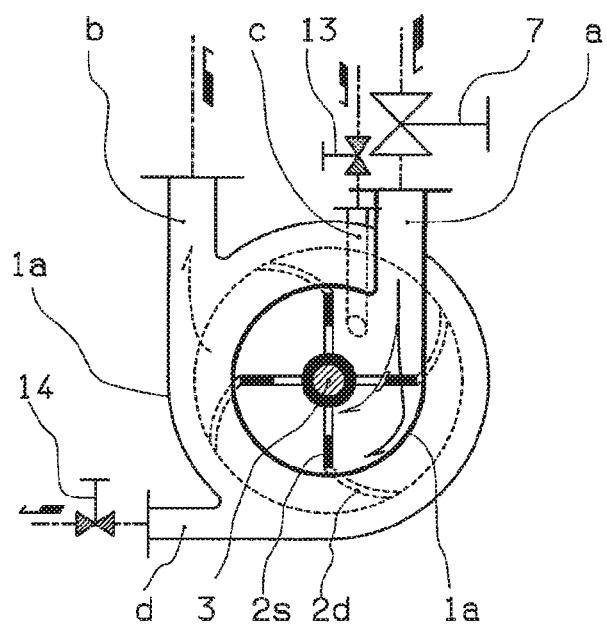
FIG. 26 is a sectional view along the line I-I in FIG. 25.

The fourteenth embodiment in FIG. 23 shows an example of liquid being pumped to the point of use utilizing the discharge pressure of the gas-liquid separator A itself instead of the booster pump 19 in the system of the thirteenth embodiment. In this case, discharge flow from the gas-liquid separator A is split by throttle adjustment of valves 21 and 22, and part of the flow returns through the storage tank 15.

The rest of the constitution and functions are the same as those of the thirteenth embodiment.

Now, technical matters which are common to the respective embodiments will be explained.

The separation position of the casings 1a and 1b is not restricted to the position shown in each illustration, and may be suitably selected in the design. The number of separations is not restricted to two, and may be three or more as long as there are no problems in disassembling and cleaning.

As to the shape of the discharge impeller part 2d of the impeller 2, various shapes of any known type such as non-clog, open, semi-open, and closed types may be used. Connecting passages or notches which suitably connect the front and back sides may be provided if the impeller includes a shroud, and the vane type may be a volute type or a radial type. In addition, the function of the discharge impeller part 2d may be substituted by a different type of pump other than the centrifugal pump shown in each embodiment. These other types include a mixed flow pump, an axial flow pump, a vortex pump, a diaphragm pump, and a gear pump. Also for the separation impeller part 2s, various shapes of any known type may be used, and the vane type may be a volute type or a radial type.

The shape of the baffle members 2p and 2q may be suitably selected from types such as a plate type or a block type. Alternatively, these baffle members can be omitted depending on the system specifications.

The throttles means 7a and 7b may be suitably selected from a fixed orifice or various valves, and a remote or automatic operation system can be employed. In addition, a means of breaking up or filtering foreign materials contained in the liquid may be installed in the pumped liquid passage of this apparatus.

Also, an additional cleaning fluid inlet and drain for enhancement of CIP cleaning may be provided at a suitable position.

In addition, the motor which rotates the rotating shaft 3 may be suitably selected according to the use condition. For example, if this apparatus is integrated with a submersible motor, and the rotating shaft of the motor is used as the rotating shaft 3 for this apparatus, the apparatus can be made compact with no need for the shaft bearing part 5 of this apparatus. A waterproof measure for the motor while cleaning is also unnecessary, and even placing this apparatus with the motor underwater is possible.

To further improve the gas-liquid separation performance or the pump performance (such as pump head or discharge amount) of this apparatus, the casing and the impeller may be provided in a multistage structure, and multiple apparatuses may be connected by piping and operated in series or in parallel. The vacuum device 6 can be of various known types, and also the number installed is not limited to one and any number of vacuum devices may be added.

Furthermore, various changes in design such as changes to the numbers, positions or combinations of the constituent members, or additional use of conventional art are possible within the intended scope of the present invention. Material qualities may also be suitably selected. Thus, the present invention is not limited to the above-described embodiments.

INDUSTRIAL APPLICABILITY OF THE INVENTION

The present invention provides a gas-liquid separator with enhanced performance and easy operation, having a gas-liquid separation mechanism with a simple structure and stable and dependable operation, allowing the use of a powerful vacuum device. This enables gas-liquid separation functions such as advanced defoaming or degassing operations, facilitates easy CIP cleaning and disassembly cleaning that meet sanitary specifications, and makes possible its use with various kinds of liquids such as food materials and chemicals. It is free from troubles caused by pumped liquid penetration into the vacuum device, and is durable against an eccentric load to the rotating shaft caused by an uneven flow of the pumped liquid on the suction side. It can easily be enlarged in size, and complete automatic operation is possible, saving time and labor in operation management. Attachment and detachment of the components for disassembly cleaning or inspection can be done with minimal labor, and equipment and maintenance costs are very economical. The practical effects of the implementation of the present invention are very high.

DESCRIPTION OF THE REFERENCE SYMBOLS

A gas-liquid separator
1a, 1b casing
2 impeller
2f axial end
2r axial end
2d discharge impeller part
2s separation impeller part
2p, 2q baffle member
2c cylindrical member
2n impeller nut
3 rotating shaft
4 shaft sealing part
5 bearing part
6 vacuum device
7, 7a, 7b throttle means
8 heating means
9 cavitation generating means
10 protection means (slow operation valve)

11 protection means (quick operation valve)
12 protection means (liquid holding tank)
13, 14 valve
15 storage tank
16 valve
17, 18 piping
19 booster pump
20 liquid accumulation means
21, 22 valve
a suction inlet
b discharge outlet
c cleaning fluid inlet
d drain
e, e1, e2 exhaust outlet
f exhaust passage
31 main pump
32 gas-liquid separator container
32a gas-liquid separator inlet
32b gas-liquid separator outlet
33 gas-liquid separating impeller
34 motor
35 cavity holder 36 exhaust pipe
37 vacuum device
38 protection means (liquid holding tank)
39 boosting means
r exhaust passage
s tornado-shaped cavity
t clearance with cavity holder
u gas return passage

The invention claimed is:

1. A gas-liquid separator for gas-liquid separation performed by centrifugal force of an impeller mounted on a shaft which is supported by a bearing part and rotates in a casing comprising:
   the axial end of the impeller farther from the bearing part being positioned with clearance from the inner wall of the casing so as to slide on the inner wall of the casing;
   an exhaust outlet of the casing disposed in a position opposite the sliding impeller part;
   a vacuum device connected to the exhaust outlet by an exhaust passage;
   a discharge impeller part providing discharge force to the passing fluid formed around the axial end of the impeller;
   a discharge outlet of the casing disposed in a position opposite the discharge impeller part; and
   a suction inlet of the casing disposed in a position closer to the bearing part than the discharge outlet, said suction inlet having a passage leading to an opening to the inside of the casing.

2. The gas-liquid separator according to claim 1, wherein the opening of the suction inlet to the inside of the casing is disposed in a position inwardly apart from the inner peripheral wall of the casing by a predetermined distance.

3. The gas-liquid separator according to claim 1, wherein the impeller is provided with at least one baffle member which prevents the direct penetration of liquid near the rotating shaft into the exhaust outlet.

4. The gas-liquid separator according to claim 1, wherein the opening of the exhaust outlet to the inside of the casing is disposed in a position inwardly apart from the inner wall of the casing by a predetermined distance.

5. The gas-liquid separator according to claim 1, wherein the impeller is provided with at least one cylindrical member coaxially attached to the impeller.

6. The gas-liquid separator according to claim 1, wherein a cleaning fluid inlet is provided on the casing.

7. The gas-liquid separator according to claim 1, wherein at least one of a throttle means, a heating means, an accumulation means, a cavitation generating means, and/or an automatic control means for flow rate, pressure or temperature is inserted in the passage of the passing fluid.

8. The gas-liquid separator according to claim 1, wherein a protection means which allows gas passage but prevents liquid passage is inserted in the exhaust passage from the exhaust outlet to the vacuum device.

9. The gas-liquid separator according to claim 1, wherein at least a portion of the discharged fluid from the discharge outlet is returned to the suction inlet.

10. The gas-liquid separator according to claim 2, wherein the impeller is provided with at least one baffle member which prevents the direct penetration of liquid near the rotating shaft into the exhaust outlet.

11. The gas-liquid separator according to claim 2, wherein a cleaning fluid inlet is provided on the casing.

12. The gas-liquid separator according to claim 3, wherein a cleaning fluid inlet is provided on the casing.

13. The gas-liquid separator according to claim 10, wherein a cleaning fluid inlet is provided on the casing.

14. The gas-liquid separator according to claim 2, wherein at least one of a throttle means, a heating means, an accumulation means, a cavitation generating means, and/or an automatic control means for flow rate, pressure or temperature is inserted in the passage of the passing fluid.

15. The gas-liquid separator according to claim 3, wherein at least one of a throttle means, a heating means, an accumulation means, a cavitation generating means, and/or an automatic control means for flow rate, pressure or temperature is inserted in the passage of the passing fluid.

16. The gas-liquid separator according to claim 10, wherein at least one of a throttle means, a heating means, an accumulation means, a cavitation generating means, and/or an automatic control means for flow rate, pressure or temperature is inserted in the passage of the passing fluid.

17. The gas-liquid separator according to claim 2, wherein a protection means which allows gas passage but prevents liquid passage is inserted in the exhaust passage from the exhaust outlet to the vacuum device.

18. The gas-liquid separator according to claim 3, wherein a protection means which allows gas passage but prevents liquid passage is inserted in the exhaust passage from the exhaust outlet to the vacuum device.

19. The gas-liquid separator according to claim 2, wherein at least one of the opening of the suction inlet to the inside of the casing or the part of the impeller facing the opening of the suction inlet is formed in a shape that promotes dispersal of the fluid flowing in from the suction inlet.

20. The gas-liquid separator according to claim 2, wherein the passage of the suction inlet leading to the opening to the inside of the casing is built into the body of the casing.

* * * * *